US011954776B2

(12) United States Patent
Geivett et al.

(10) Patent No.: US 11,954,776 B2
(45) Date of Patent: Apr. 9, 2024

(54) DISPLAY OF RELATED OBJECTS IN COMPARTMENTALIZED VIRTUAL DISPLAY UNITS

(71) Applicant: IMAPLAYER, LLC, Carson City, NV (US)

(72) Inventors: William Geivett, Tucson, AZ (US); Christopher Hayes, Cromwell, CT (US)

(73) Assignee: IMAPLAYER, LLC, Carson City, NV (US)

( * ) Notice: Subject to any disclaimer, the term of this patent is extended or adjusted under 35 U.S.C. 154(b) by 0 days.

(21) Appl. No.: 17/954,931

(22) Filed: Sep. 28, 2022

(65) Prior Publication Data

US 2023/0014789 A1  Jan. 19, 2023

Related U.S. Application Data

(63) Continuation of application No. 17/130,305, filed on Dec. 22, 2020, now Pat. No. 11,481,942.
(Continued)

(51) Int. Cl.
| | |
|---|---|
| *G06T 11/60* | (2006.01) |
| *G06F 3/0482* | (2013.01) |
| *G06Q 30/0251* | (2023.01) |
| *G06Q 30/0601* | (2023.01) |
| *G06Q 50/00* | (2012.01) |

(Continued)

(52) U.S. Cl.
CPC ............ *G06T 11/60* (2013.01); *G06F 3/0482* (2013.01); *G06Q 30/0269* (2013.01); *G06Q 30/0643* (2013.01); *G06Q 50/01* (2013.01); *G06T 3/40* (2013.01); *G06F 16/252* (2019.01); *G06T 2200/24* (2013.01)

(58) Field of Classification Search
CPC ....... G06T 11/60; G06T 3/40; G06T 2200/24; G06F 3/0482; G06F 16/252; G06Q 30/0269; G06Q 30/0643; G06Q 50/01
USPC .......................................................... 715/745
See application file for complete search history.

(56) References Cited

U.S. PATENT DOCUMENTS

| | | | |
|---|---|---|---|
| 7,266,511 B2* | 9/2007 | Teshima ............... | G06Q 20/208 |
| | | | 705/26.61 |
| 8,219,452 B2 | 7/2012 | Savilia et al. | |

(Continued)

FOREIGN PATENT DOCUMENTS

WO     2016144622 A1     9/2016

OTHER PUBLICATIONS

International Search Report and the Written Opinion, PCT/US2020/066513, dated Feb. 12, 2021, 10 pages.

*Primary Examiner* — William D Titcomb
(74) *Attorney, Agent, or Firm* — Edell, Shapiro & Finnan, LLC

(57) ABSTRACT

A unified platform obtains, stores, and shares search results based on user profiles or groups with a common interest. User profiles or group profiles may be used to identify categories containing objects related to a common interest, and the objects may be selected for placement in a graphical user interface from which they may be purchased by or for the user. The objects may preferably be virtual objects stored in a virtual locker or other virtual display unit. Users are able to conduct web-based searches for products or services from different websites and store dimensional representations of virtual products or services in a unified platform.

20 Claims, 18 Drawing Sheets

Related U.S. Application Data

(60) Provisional application No. 62/953,723, filed on Dec. 26, 2019.

(51) Int. Cl.
*G06T 3/40* (2006.01)
*G06F 16/25* (2019.01)

(56) References Cited

U.S. PATENT DOCUMENTS

| | | | |
|---|---|---|---|
| 8,346,626 B2 | 1/2013 | Robertson | |
| 8,433,623 B2 | 4/2013 | Lawrence et al. | |
| 8,478,661 B1 | 7/2013 | Kressler | |
| 8,412,585 B2 | 8/2013 | Carpenter | |
| 8,583,764 B2 | 11/2013 | Jerome | |
| 9,053,510 B2 | 6/2015 | Crum | |
| 9,373,139 B2 | 6/2016 | Kressler | |
| 9,721,394 B2 * | 8/2017 | Rosenthal | H04N 23/632 |
| 9,852,409 B2 | 12/2017 | Artman et al. | |
| 9,953,378 B2 | 4/2018 | Purves et al. | |
| 10,380,674 B2 | 8/2019 | Freeman et al. | |
| 10,504,173 B1 | 12/2019 | Traina et al. | |
| 10,515,137 B1 * | 12/2019 | Sirota | G06F 40/106 |
| 10,546,342 B2 | 1/2020 | Traina et al. | |
| 10,970,694 B2 * | 4/2021 | Conforti | G06Q 30/0605 |
| 2007/0288486 A1 | 12/2007 | Sugihara | |
| 2011/0208619 A1 | 8/2011 | Siounis et al. | |
| 2013/0332379 A1 | 12/2013 | Hayes et al. | |
| 2014/0100957 A1 | 4/2014 | Jerome | |
| 2014/0164887 A1 | 6/2014 | Koukoumidis et al. | |
| 2014/0222604 A1 | 8/2014 | Yellapragada | |
| 2014/0229479 A1 | 8/2014 | Sharafi et al. | |
| 2015/0025982 A1 | 1/2015 | Drummey et al. | |
| 2015/0032554 A1 | 1/2015 | Hayes et al. | |
| 2015/0235277 A1 | 8/2015 | Bagley | |
| 2016/0232515 A1 | 8/2016 | Jhas et al. | |
| 2016/0261599 A1 | 9/2016 | Perry et al. | |
| 2016/0266386 A1 | 9/2016 | Scott et al. | |
| 2016/0267577 A1 | 9/2016 | Crowder et al. | |
| 2016/0335667 A1 * | 11/2016 | Aubrey | H04L 63/08 |
| 2017/0063777 A1 | 3/2017 | Ekberg | |
| 2017/0323374 A1 * | 11/2017 | Park | G06F 3/147 |
| 2018/0089735 A1 | 3/2018 | Lenahan et al. | |
| 2018/0276727 A1 | 9/2018 | Patel et al. | |
| 2019/0147516 A1 | 5/2019 | Bawge et al. | |
| 2019/0215424 A1 * | 7/2019 | Adato | G06T 7/521 |
| 2019/0215574 A1 | 7/2019 | Saxena et al. | |
| 2019/0236531 A1 * | 8/2019 | Adato | H04N 23/80 |
| 2019/0251750 A1 * | 8/2019 | Brewer | G06F 3/0304 |
| 2019/0311341 A1 * | 10/2019 | Rice | H04L 9/0637 |
| 2019/0347680 A1 | 11/2019 | Layman | |
| 2020/0117336 A1 * | 4/2020 | Mani | F25B 49/005 |
| 2021/0055801 A1 * | 2/2021 | Lee | G06F 3/011 |
| 2021/0082190 A1 * | 3/2021 | Singh | G06Q 50/163 |
| 2021/0224948 A1 * | 7/2021 | Steiner | G06T 3/40 |

* cited by examiner

FIG. 14

DISPLAY OF RELATED OBJECTS IN COMPARTMENTALIZED VIRTUAL DISPLAY UNITS

CROSS-REFERENCE TO RELATED APPLICATION

This application is a continuation of U.S. patent application Ser. No. 17/130,305, filed Dec. 22, 2020, entitled "Display of Related Objects in Compartmentalized Virtual Display Units", which claims the benefit of U.S. Provisional Patent Application No. 62/953,723, filed Dec. 26, 2019 by William Geivett and entitled "Method Of Establishing And Servicing A Personal Sales Portal", the entire disclosure in which is incorporated herein by reference.

BACKGROUND

Technical Field

This disclosure is directed to arrangement and display of related virtual objects within a plurality of compartments in a graphical user interface (GUI) such as a virtual container visually configured for relevance to the object, wherein the objects are selected based on a theme or user profile. For purposes of this disclosure, objects are iconic or virtual representations of articles of commerce.

Background

Search engines may filter through a seemingly infinite number of products to return results ranked by best match criteria. Such searches are generally conducted in an ad hoc manner, relying upon popularity or other factors not related to a particular user to rank results. Content is often limited to products from specific websites with different web URLs for different websites.

Management of search results from different websites typically involves creating an account for each website to manage search results. For multiple websites, this process may be time-consuming and onerous. Retrieving search results involves storing these results separately using the application or platform associated with each website.

These approaches have limitations, including returning limited or biased search results, not results customized to a specific user, and/or being difficult to store and share.

Terminology

As used herein, the following terms have these meanings:

"Display unit" means an object container for receiving objects such as products or other goods for storage and display. Examples, without limitation, include, lockers, cabinets, point of sale display racks, shelving units, vanities, closets, retail shop tables and shelves, etc.

"Virtual" means a digitally created representation or version of a real item or device that has sufficient visual similarity to the item or device to be recognized as such item or device when visually displayed on a screen or the like.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An arrangement is disclosed wherein a unified platform is provided to obtain, store, and share search results based on user profiles or groups with a common interest. User or group profiles may be used to identify categories of objects related to a common interest, and the objects may be presented to a user and selected for placement as virtual objects in a graphical user interface (GUI) simulating a virtual locker, in a particular embodiment, or other virtual display unit in general. In the particular embodiment, the virtual objects (e.g., in the form of icons simulating those objects) may be stored in a compartmentalized virtual locker with differently depicted and shaped compartments appropriate to the size and shape of the stored objects. Based on this approach, users are able to conduct web-based searches for products or services from different websites, and store dimensional representations of the products or services, generally referred to herein as objects, in a unified platform. The objects may later be purchased by or for the user by clicking on links to retailers, or the like, associated with the stored virtual objects.

Methods, systems and computer readable media are disclosed for generating one or more virtual lockers, each being associated with a user profile and comprising a plurality of compartments for storing one or more objects. A list of profile-filtered objects is obtained and, based on input from the user, an object to be stored in the virtual locker is selected and stored in a selected locker compartment.

A method and system are disclosed herein comprising: establishing for selective display at each of multiple client systems a respective graphical compartmentalized virtual display unit; at each virtual display unit establishing a respective theme reflecting an interest of the user of the client system at which that virtual display unit is established; and selectively obtaining, and displaying in compartments of each virtual display unit, virtual objects within the scope of the interest of the user of the client system at which virtual display unit is established.

Also disclosed are a method and system comprising: establishing for selective display at each of plural client systems a compartmentalized virtual locker having plural compartments; associating a profile of the user of each client system with the virtual locker of that client system; establishing themes for the virtual lockers, the themes reflecting interests of the users of respective client systems; storing at a system database the themes and profiles of the users; for each client system, obtaining a list of objects that are filtered based on the profile of the user of that client system and the theme of the virtual locker at that client system; and enabling the user of each client system to select one or more objects from the list that are of interest to that user, and populating the compartments of the virtual locker with virtual representations of the user-selected objects. One or more iconic images may be holograms or other images that are visually recognizable as a product or other service or item. In some embodiments third party marketers are enabled to transmit, to a client system's virtual locker, promotional material pertaining to the selected objects in that virtual locker. In some embodiments, if it is determined that an image of a virtual object does not fit within a selected locker compartment, the shape and/or size of the virtual object image may be transformed to fit.

Also disclosed is a functionality for sellers, merchants and retailers to create virtual storefronts using the virtual display concept. These users are able to generate their own virtual storefront, which may be located in a user's virtual mall, to promote products for purchase by others by adding them as virtual objects to their lockers.

Advantages of approaches described herein include but are not limited to allowing ease of identifying and storing objects returned from a search in a unified platform. Disclosed techniques may generate, transform, scale or warp objects, and arrange related objects (e.g., products, activities, interests, areas of service, etc.) obtained from a variety of websites into specific compartments of a virtual display unit. Accordingly, descriptions are not to be construed as limited to the content of a given website but may span multiple websites. The virtual display unit provides efficiency in identification, selection, storage, and sharing of objects and may interface with other platforms for sharing, selling and/or distributing objects. Accordingly, objects may be stored in a virtual display unit to provide a single point of access to the stored objects.

In some aspects of this disclosure a virtual compartmentalized locker or other display unit may comprise a plurality of virtual lockers or display units; that is, a user may have multiple lockers, each having a different theme or combination of themes. In other aspects, the user may select a general theme to include objects spanning or encompassing different areas of interest. These generic compartmentalized virtual display units allow users to search different categories and to store different related or unrelated objects in a central location.

As noted above, the compartmentalized virtual locker allows users to store a plurality of related objects associated by a theme (e.g., category, genre, etc.). The theme of the locker, in combination with the user's profile, may automatically determine specific objects that are uploaded into the user's graphical display region (e.g., as a list) for review and selection. Once objects are uploaded into the graphical display region, the user may select one or more objects to store in the locker as virtual objects. In some cases, the user may select a placeholder for an object when a specific object has not yet been selected.

In order to store a virtual object in a dimensionalized compartment of a virtual display unit, the virtual object may be transformed (e.g., reconfigured by warping, scaling, or rotating) in order to fit within the dimensions of the compartment. Multiple virtual objects may be placed within a single compartment, and the system may arrange the objects by size. For example, the sizes of the virtual objects within a compartment may be compared and placed in order of decreasing size so as to allow at least a portion of each virtual object in the compartment to be visible in that compartment of the user's display unit.

The system may be integrated with social media networks. For example, a social media account for a user may include or link to a virtual locker room containing a plurality of compartmentalized virtual lockers or to a single such locker. By integrating with social media applications, virtual lockers and virtual locker rooms may be shared with other social media users. For example, users can publicly share lockers of selected objects with their social media connections. In other aspects, lockers may be shared as a "closed group" on the social media platform. Both approaches allow users to share objects obtained from a variety of other websites in an efficient manner.

Disclosed embodiments may generate a themed compartmentalized virtual locker or other display unit for a user and may present to a user objects associated with a specific theme, wherein objects may include holograms or other dimensional representations of an object for demonstrating properties of the virtual object to a user. The objects may be stored for later retrieval, and users may share their virtual lockers within social media or other network groups.

Techniques and embodiments disclosed herein provide methods, systems, and computer readable media for generating, obtaining, and/or arranging objects, corresponding to products, services or other items from a plurality of websites, in a virtual locker. The virtual locker may be shared among members of a social media group or the public to facilitate distribution and/or sales of the corresponding products, services or other items.

BRIEF DESCRIPTION OF THE DRAWINGS

By way of example, specific embodiments of the disclosed system and method are described below with reference to the accompanying drawings in which:

FIG. 14 is a screen shot showing a public view of a graphical compartmentalized virtual locker that has been shared with other users.

DETAILED DESCRIPTION

Figure 1:
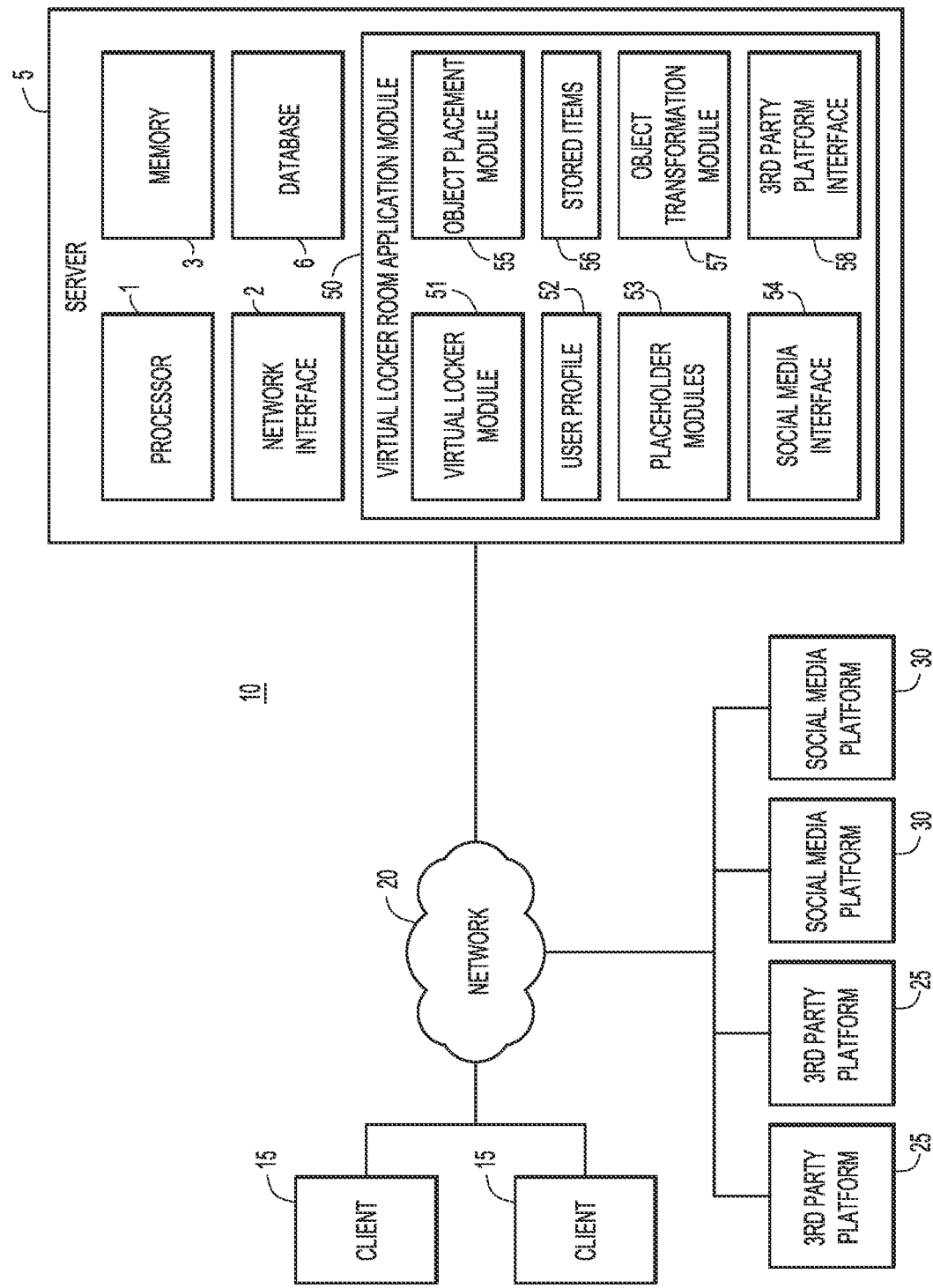
FIG. 1 is a computing environment for a graphical compartmentalized virtual locker room and virtual locker, according to an embodiment of the techniques disclosed herein.

Embodiments are described more fully below with reference to the accompanying drawings in which several exemplary embodiments are shown. It will be readily understood that components of the embodiments as generally described and illustrated could be arranged and designed in a variety of different configurations. Thus, the following detailed description of various embodiments, as represented in the figures, is not intended to limit the scope of the present disclosure but is merely representative of various embodiments. While various aspects of the embodiments are presented in the drawings, the drawings are not necessarily drawn to scale unless specifically indicated.

The present systems and methods may be embodied in other specific forms without departing from its spirit or essential characteristics. The described embodiments are to be considered in all respects only as illustrative and not restrictive. The scope of the inventions disclosed herein is, therefore, indicated by the appended claims rather than by this detailed description. All changes which come within the meaning and range of equivalency of the claims are to be embraced within their scope.

Reference in this specification to features, advantages, or similar language does not imply that all of the features and advantages that may be realized from this disclosure should be or are in any single embodiment of the claimed inventions. Rather, language referring to the features and advantages is means that a specific feature, advantage, or characteristic described in connection with an embodiment may be included in at least one embodiment of the claimed inventions. Thus, discussions of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize, in light of the description herein, that the claimed inventions can be practiced without one or more of the specific features or advantages of a particular embodiment. In other instances, additional features and advantages may be recognized in certain embodiments that may not be present in all embodiments.

An online system is provided comprising one or more graphical compartmentalized virtual lockers (or other virtual display units) containing a plurality of virtual objects. The user designates a theme for the virtual locker, and the system automatically populates the virtual locker with the objects (e.g., images of products, services, and/or other information pertaining to that theme). Users may have more than one themed virtual locker or can select multiple themes to allow objects not associated with the primary theme to be added to the virtual locker. In other aspects, the user may populate the virtual locker with objects/information independently without relying on the system and may authorize other users of the group to do the same.

Objects are filtered and ranked for display to the user. For example, objects may be filtered based on the theme of the virtual locker. The filtered list may be ordered or ranked based on objects downloaded into virtual lockers by other users having the same theme. The filtered list may be ordered based on a profile or demographic information of the user.

Users may add virtual objects to their lockers using hologram selection processes that may involve generating and transforming images. When the object is a product, the hologram represents a three-dimensional image of the product, and that virtual object is placed in a compartment according to its dimensions. In cases in which a virtual object does not fit within a compartment of the virtual locker, the object may be transformed (e.g., resized, rotated, warped, etc.) in order to fit. If multiple objects are placed within the same compartment, the system may arrange the objects within the compartment so that at least a portion of each object can be visualized by a user. When the user clicks or hovers over the object with a cursor, a list of related items appears, allowing the user to select additional objects. For example, each object may have a plurality of associated characteristics, including an overall product user rating, product reviews, number of other users that have selected the object for download into their lockers, etc.

Users may grant access to their social media connections to view respective virtual lockers. Additionally, users may forward selected locker contents to their connections from the social media site. Objects may be purchased by the user, or for the user by the user's connections. When a product/object is selected for purchase, the user's email and/or physical address may be automatically uploaded for product delivery via email or to a postal address, as appropriate.

Unlike prior systems, the present system can automatically populate compartmentalized virtual lockers or other display units with objects and other information related to a user's designated theme, and interface with a user's social media platform via portals for access to the objects. The present system allows for the collection of products stored in a dedicated area on the user's social media account or linked to the user's social media account. The social media platform allows for users to receive information from a newsfeed of third parties and to add objects directly to the virtual locker, to view them as virtual objects in virtual lockers of other users, and to add virtual objects to their virtual lockers.

FIG. 1 depicts a computing environment 10 for an app embodiment that generates virtual lockers and virtual locker rooms, according to aspects of the present disclosure. The environment may include one or more server systems 5, one or more client or end-user systems 15, one or more $3^{rd}$ party platforms 25, and one or more social media platforms 30. Server systems 5, client systems 15, $3^{rd}$ party platform 25, and social media platforms 30 may be remote from each other and communicate via network 20 which may be implemented by any suitable communications medium, such as wide area network (WAN), local area network (LAN), Internet, Intranet, etc. Alternatively, server systems 5, client systems 15, $3^{rd}$ party platform 25, and social media platform 30 may be local to each other, and may communicate via an appropriate local communication medium, such as local area network (LAN), hardwire, wireless link, Intranet, etc.

Client systems 15 include processors that enable users to access and set up virtual locker rooms and virtual lockers for local graphical display. Server systems 5 comprise a virtual locker room application module to set up virtual lockers. A database system 6 may store various information including user profiles, objects, themes, customizations, etc.

Figure 2:
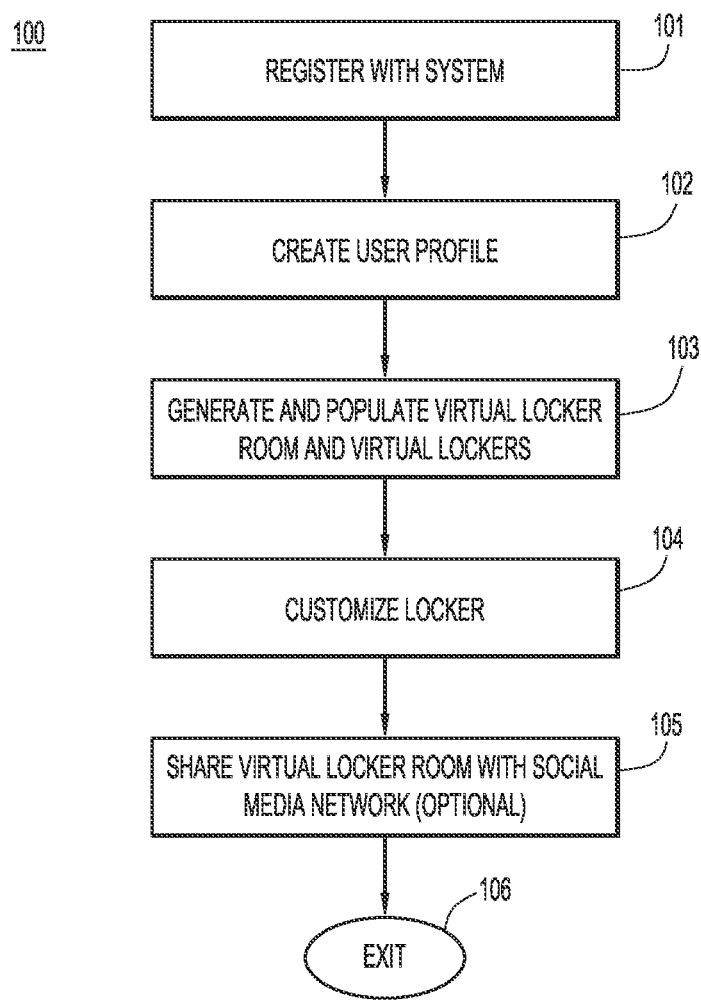
FIG. 2 is a high-level flow diagram of operations associated with generating a graphical compartmentalized virtual locker room/virtual locker according to an embodiment of the techniques disclosed herein.

FIG. 2 shows a flow diagram 100 for generating a graphical compartmentalized virtual locker. At operation 101 a user registers with the system by providing identifying information (e.g., email address and password), and at 102 the user creates a profile by entering requested information, e.g., by means of a form having data entry fields. At operation 103 a virtual locker room and virtual lockers are generated and populated (see also FIG. 3). For example, the virtual locker is populated with objects from a plurality of $3^{rd}$ party websites (or objects are generated from an image if needed). At operation 104 the virtual locker is customized, and at 105 the virtual locker may optionally be shared with a social media network. At operation 106, the user exits the program.

Figure 3:
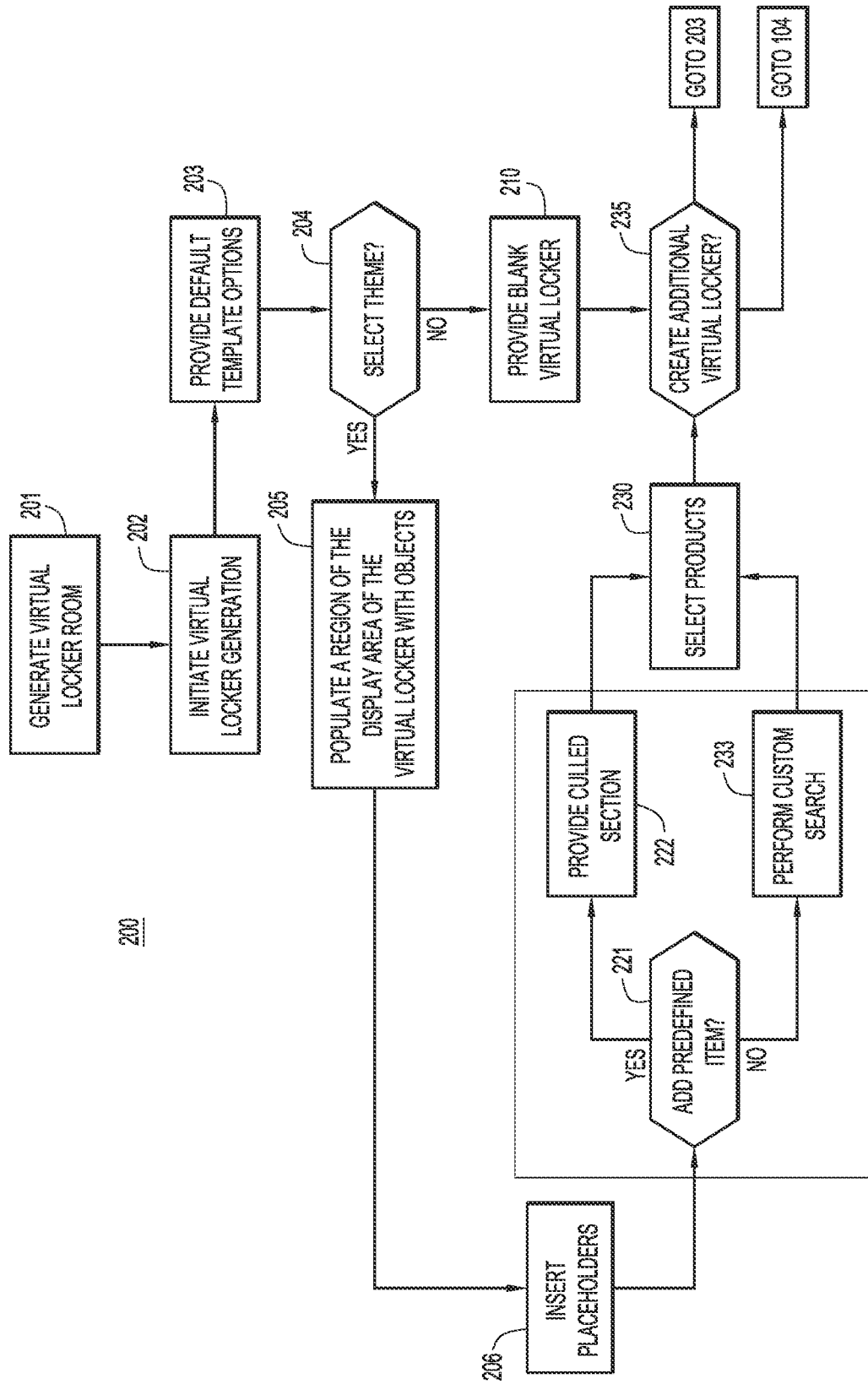
FIG. 3 is a detailed flow diagram of operations for generating a graphical compartmentalized virtual locker room/virtual locker according to an embodiment of the techniques disclosed herein

FIG. 3 is a flow diagram 200 showing operations for generating virtual lockers and storing objects that may be accessed at a later point in time. At operation 201, a virtual locker room is generated to contain each virtual locker generated by a user. The virtual locker room allows navigation between its virtual lockers, e.g., on a network-connected device. At operation 202, virtual locker generation is initiated by a user.

At operation 206 placeholder items, which fit into compartments of the virtual locker, automatically populate the compartments. These placeholders are associated with predetermined objects and are selected at least in part by a user's profile. For example, a placeholder may identify a category of items that may be stored in a user's virtual locker and represents a category of product the user may want to store but does not identify a specific object. Once an object is selected, the placeholder may be replaced by the selected object.

At operation 221 a user interacts with the virtual locker (see FIG. 4) and, based on the selected theme, predefined objects associated with placeholders are displayed to the user. Predefined objects, when tapped or clicked, offer a ranked selection of specific objects (e.g., products). If an object of interest isn't shown, the user may employ a custom search to find a specific product at 233. Alternatively, at operation 222, a user may select a specific object, e.g., from a culled list, to add to the virtual locker. At operation 230 a predefined item or a custom item is added to a compartment of the virtual locker. Once the desired objects have been identified through ranking or custom search, the user can select the identified product/object and save the object to a virtual locker as a selected product.

Each placeholder may be associated with a list of objects based on one or more of manual entry, artificial intelligence, machine learning, and/or other techniques to generate a group of objects corresponding to the placeholder and determined to be pertinent and relevant to the user based on the user's profile.

Selected objects stored in a virtual locker may be archived or deleted. Archiving the object renders it no longer visible to other users visiting the public view of the virtual locker but maintains visibility of the object to the virtual locker's owner allowing the owner to unarchive the object to restore it as a selected object. In some aspects, a deleted object may remain in the system's database (soft-delete) for reporting and/or other purposes, and in other aspects, deleting an object may be irreversible.

Figure 6:
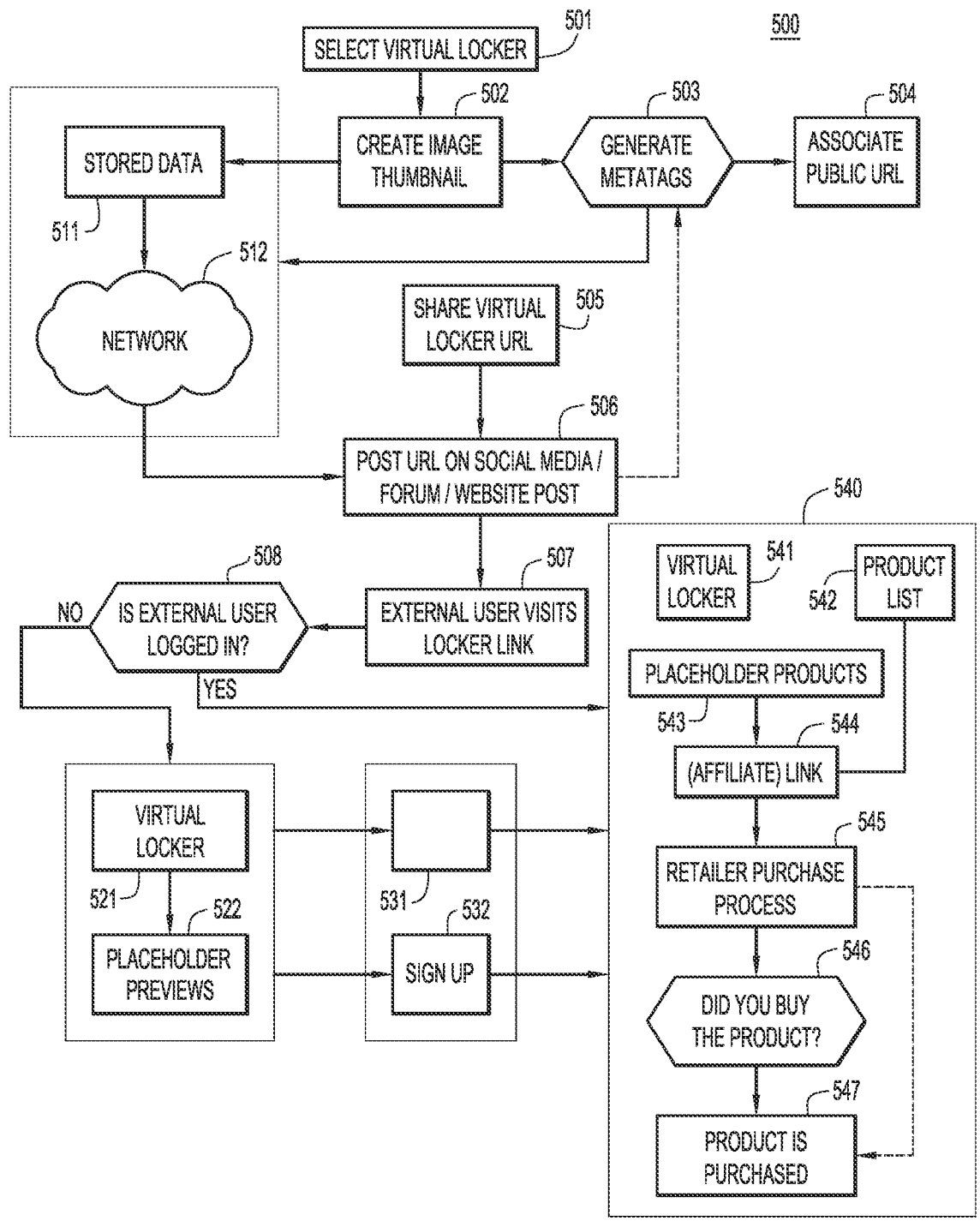
FIG. 6 is a flow diagram of operations showing sharing of a graphical compartmentalized virtual locker according to an embodiment of the techniques disclosed herein.

A selected object may be moved out of a virtual locker (FIG. 9) by the user upon purchase or by an automated function triggered by another user purchasing the product for the user (see, External User view 540 in FIG. 6). More particularly, when a product is purchased, the user may move the item to a separate compartment in the virtual locker reserved for purchased objects/products, or to a separate virtual locker of the user reserved for display of purchased objects. The user may thereafter readily determine which objects have been purchased if the user wants to add another of that product/object to his/her locker or share the product/object with a contact. The user may also add a note or other indication identifying who purchased the object.

In some cases, where a user has multiple interests in different categories, a user can create as many virtual lockers as needed. At operation 235, if a user creates an additional virtual locker, the system returns to operation 203 to provide default template options to the user. The user may generate a virtual locker for each category, selecting a default template or theme, or may generate an empty virtual locker and customize it based on user interests. Once all desired virtual lockers have been established, the process returns to operation 104.

Figure 4:
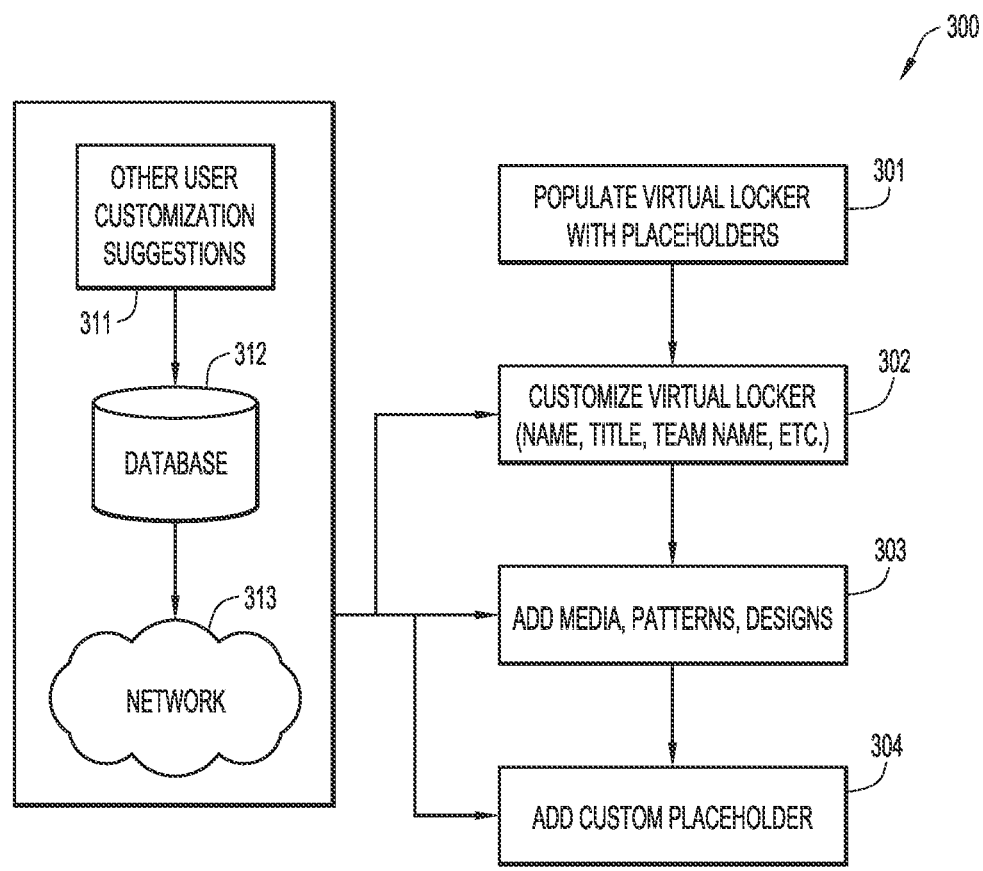
FIG. 4 is a flow diagram of operations for customizing the graphical compartmentalized virtual locker according to an embodiment of the techniques disclosed herein.

FIG. 4 is a flow chart showing an example of customization of a virtual locker; i.e., this process allows the user to customize the features of a virtual locker. The scope of customization is not intended to be limited to the options listed herein. At operation 301, default placeholders populate the virtual locker upon theme selection, the placeholders representing generic objects to be stored in the virtual locker.

At operation 302 the virtual locker is customized by one or more of: adding a name to label the virtual locker; adding a name to an object in the virtual locker; and/or adding custom colors to the background of the virtual locker or for different compartments of the virtual locker. At operation 303 media (e.g., images, GIFS, videos, etc.), patterns, and designs, may be added to the walls or other components of the virtual locker. Such media, patterns, and designs may be chosen from a library of options provided by the system, created by the user, or obtained from another user, and stored in database 312. Customizations to a locker do not change the contents of the locker or its functionality, and are intended to make the locker personalized to the user.

In some cases, another user on the system can view a connected user's virtual locker and update the connected user's virtual locker. For example, the other user may leave a personal message or may select a design update based on templates, patterns, media and objects stored in database 6 (FIG. 1). At operation 304 custom placeholders may be added to the virtual locker. For example, a user may add a placeholder that is not included in a default template for a theme. In this case the system may generate a placeholder based on input from a user, or the placeholder may be downloaded. Customized objects can be added corresponding to the customized placeholder, allowing a user to save a customized object to the virtual locker. In other aspects, a user may save a customized object to the virtual locker without generating or obtaining a corresponding placeholder. Using tools such as systematic analytics with machine learning, artificial intelligence, and manual annotation, custom placeholders may be predefined.

Figure 5:
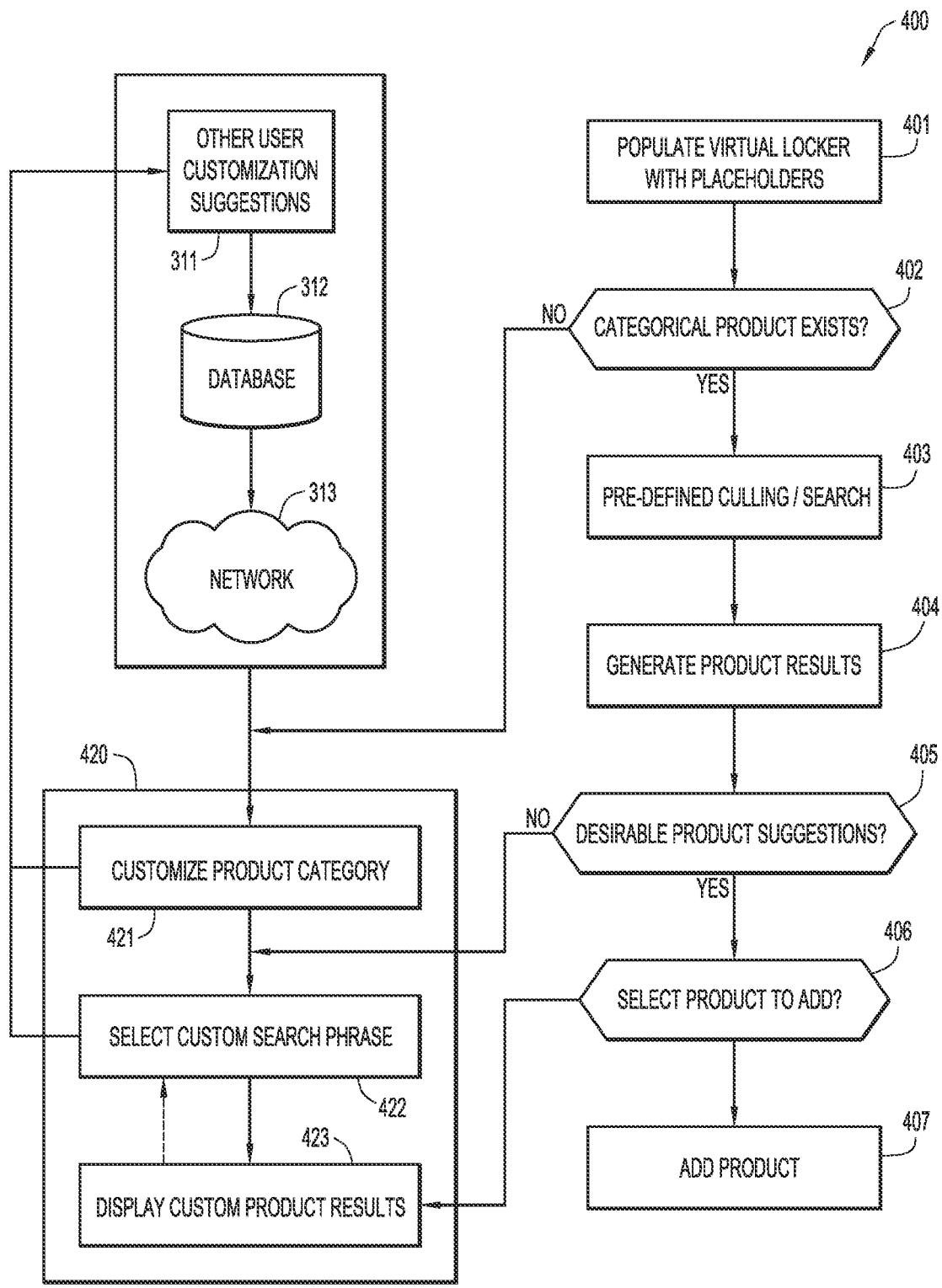
FIG. 5 is a flow diagram of operations for populating objects according to an embodiment of the techniques disclosed herein.

FIG. 5 is a flow diagram 400 showing population of a virtual locker with a placeholder. Based on the selected theme at operation 204 (FIG. 3), placeholders (e.g., predefined or customized) can be added to a virtual locker. The virtual locker displays the placeholder or a corresponding object is selected. Regardless of whether a placeholder contains a list of selectable objects, the user may add objects to the placeholder. Placeholders store multiple objects that are in the same category; for example, a user may add multiple objects to a corresponding placeholder.

At operation 401 a virtual locker is populated with placeholders. At operation 402, the system determines whether a placeholder category corresponding to an object exists. If the placeholder category exists, the user selects the placeholder category corresponding to the representative object to be added. This process may be repeated to add additional objects.

At operation 403, the system returns a pre-defined, filtered subset of objects based on the user's profile. For example, a profile may utilize demographic information including a subset of objects (e.g., products) for the user's age/experience and suitable in terms of size for the user. The subset of objects may be predefined by the system by manual selection, by advertiser/partner-driven preferential object placement, and/or based on search results for a predetermined search phrase or any other suitable manner. A list of objects is returned based on the search at operation 405. Objects of interest from the search results may be selected at operation 406 and added to the respective category at operation 407.

If the placeholder does not exist as a predefined category, the user may create a custom placeholder for the object at operation 421. In some theme designs, blank spaces may be provided to allow a user to add a custom placeholder; for example, if the object category is one for which a placeholder drawing exists (see FIG. 8). Still referring to FIG. 5, let us assume that an object either does not have a placeholder image, or there is limited space in the virtual locker to visually display the placeholder. At operation 421, the user inputs the name of the custom object category (e.g., "wristbands") and the placeholder is displayed in the virtual locker, for example, in the form of an empty box, list item, or other equivalent. At operation 422, the corresponding category name (i.e., "wristbands") is selected as the initial search phrase, for example, at the time of creating the custom placeholder or by selecting the custom placeholder, to search for and display objects to the user (e.g., products, services, etc.). At operation 423, the search results may be reviewed, and an object selected by the user, and the selected object is added as a virtual object to the corresponding locker. Alternatively, the user may edit the search phrase until suitable results are found. Once the desired object has been selected, at operation 407 the object may be saved to more than one themed virtual locker. The user may optionally choose to add the object to multiple virtual lockers at the same time.

As an example, if a user has a virtual locker for two different sports, baseball and golf, for example, and wants to add a pair of sunglasses to both virtual lockers, he/she may add a placeholder to the first virtual locker for sunglasses and then may add the specific object to the placeholder while editing the first virtual locker. At the time of adding the object to the first virtual locker, the option to save the object in other virtual lockers may also be offered. This allows the user to easily and efficiently duplicate objects across multiple virtual lockers, as appropriate.

The system may use the results of the process shown at 420 to improve custom object category search results for future users, to suggest predefined categorical placeholders (e.g., if 35% of baseball-themed virtual lockers use custom-add "wristbands", there should be a predefined category placeholder for wristbands for all baseball-themed lockers), and to systematically display cross-promotional objects. Search terms or phrases to identify the objects may be stored by the system in a database, other disk storage, or other non-transient media. In some aspects, through manual means, machine learning, or artificial intelligence, the search terms or phrases may be used for future object searches and suggestions by the system and distributed over a network to other user devices.

FIG. 6 is a flow diagram 500 for sharing a virtual locker. To share a virtual locker the user disseminates the virtual locker on a public forum (e.g., social media, blogs, personal website, or otherwise) to friends and/or the general public, providing his/her customizations and objects/products to the shared group.

At operation 501, the user selects the virtual locker for sharing. At operation 502 an image thumbnail of the virtual locker is generated, depicting the placeholders (custom and pre-defined) as well as any customizations (e.g., name, title, team, colors, media, etc.) created by the user. At operation 503 the image is referenced by metatags, and at 504 a system-generated public URL is associated with the virtual locker. For example, when the virtual locker is copied and pasted, embedded, or otherwise referenced, the URL displays the image of the customized locker, and the user may paste the public URL into a social media platform as part of a comment or post; the platform may automatically retrieve and display the image per Open Graph sharing protocols. At operation 505 the virtual locker URL is shared.

At operation 506 the user posts or shares his/her virtual locker on a public forum by posting a URL. The platform may reference the metatags, which provides the created image via the data store 511 on the application via network 512, thereby creating a rich media post on the social media (or other) platform. At operation 507 an unrelated user, referred to as an "external user", may visit the virtual locker link from operation 506.

At operation 508 it is determined (e.g., using cookies or other tracking information) whether or not an external user is logged into the system. If the external user is not logged in, at operation 521 a less-detailed public view of the virtual locker is provided to the external user, with additional details reserved for viewers who are logged in. Placeholders and virtual locker previews are visible to a user who is not logged in or an external user, and at operations 531 and 532 the external user is prompted to login or sign up. Upon logging in the external user becomes a known user and is able to access the full view.

When an external user visits the public virtual locker URL and is a known user (as determined by cookies, etc.), the external user views the known external user view. The known external user is prompted with a notification stating, e.g., "You are following [the user name]'s profile now". The known external user is provided with the option of un-following the locker's owner. The view may display the virtual locker with all placeholders (pre-defined and custom) and a detailed product list allowing that known external user to visualize an overview of all products in the respective virtual locker. At operation 544 a placeholder product is selected; or based on the object list, the known external user accesses a third party retailer via an affiliate link. At operation 545 the user views and/or potentially purchases one or more objects in the virtual locker. At operation 546, when a known external user navigates away from the application to an outside retailer, the external user is asked upon returning to the application whether or not the product was purchased. Responses are stored in the database at 547, referenced to the user's virtual locker, and may be used for data collection purposes by the system.

If the retailer allows the checkout process to be embedded within the application via APIs, SDKs or otherwise, or through networked callbacks, the system may not determine whether or not the known external user purchased the item.

In this case the data is stored automatically at 548 and does not need to be prompted at 547 by the known external user.

Figure 7:
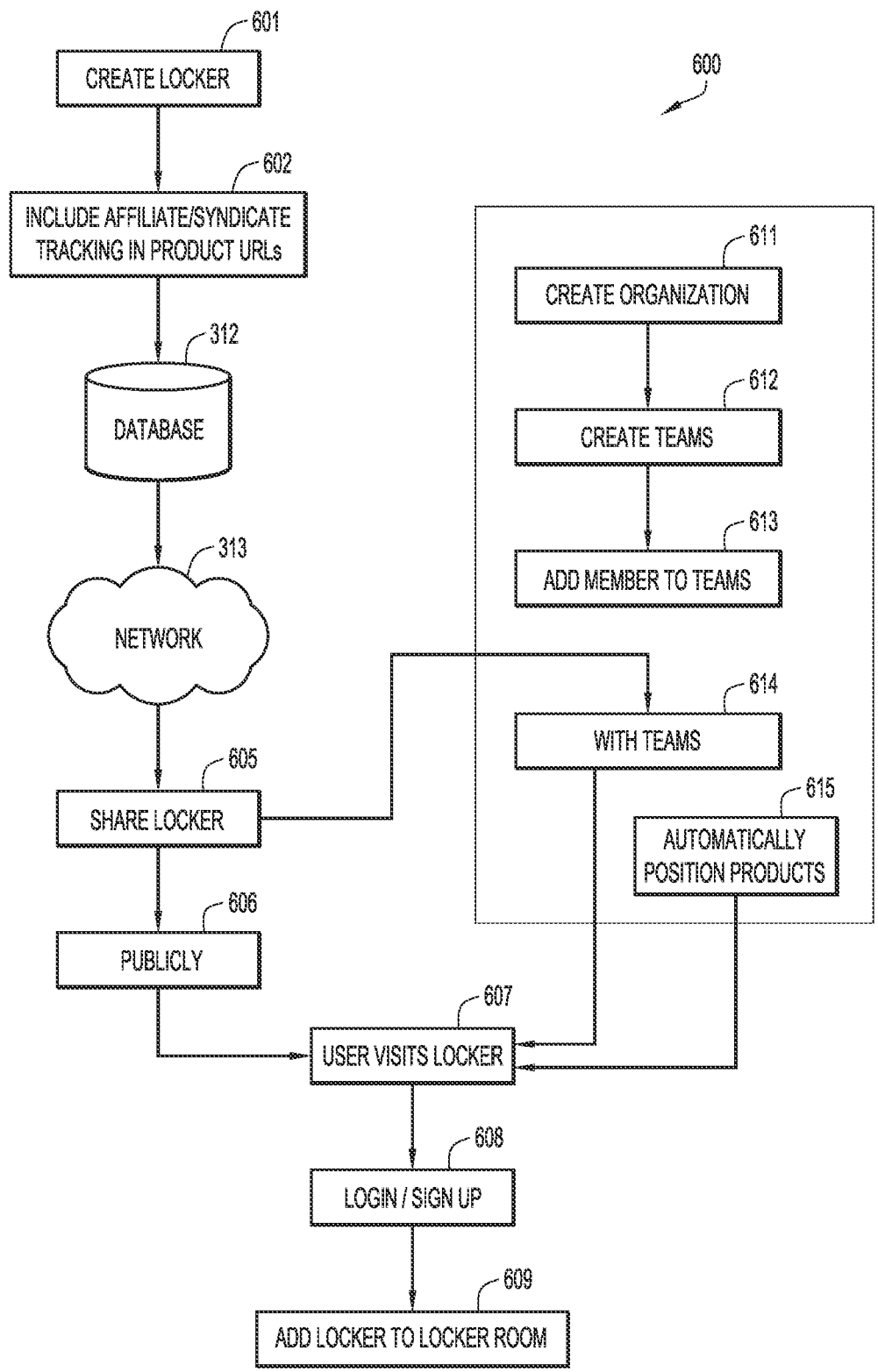
FIG. 7 is a flow diagram showing of operations showing assigning or syndicating a graphical compartmentalized virtual locker to other users according to an embodiment of the techniques disclosed herein.

FIG. 7 depicts a flowchart in which a user creates and assigns a virtual locker to another user within the system. By way of example, this functionality is provided in two forms: (1) with team organizations whereby an administrator of an organization creates a virtual locker for each of the teams in the organizational structure; and/or (2) with social media "influencers" that create virtual lockers that fans may download. Influencers and team organizers are referred to in this function as users.

For a team organization, the administrator may invite each team member to create an account with the system and then create the team locker automatically. Alternatively, the team locker may be created automatically if the team members already have an account with the system. Social media influencers may save their favorite items to a virtual locker and then share their virtual object list with their fans via social media or other avenues. Another user can duplicate an influencer's virtual locker and automatically add those items to that user's own virtual locker.

At operation 601 a user populates a virtual locker with items according to the functions described and illustrated in reference to FIG. 4. At 602 a tracking code within the system, corresponding to a product URL, is added to a table in the system's database 603 and used to track data associated with virtual lockers and to track other users. Through the system's internal network 604 and/or other networks (e.g., social media, blogs, etc.), at operation 605 the user shares the virtual locker with other users 614.

In some cases, an organization or team may first need to be created. At operation 611 an organization is created based on basic information (e.g., name, location, website, email contact info, etc.). At 612 teams are generated, and at operation 613 team members are added.

Teams may have different gear requirements and separate virtual lockers may be generated for each team. The user shares the virtual locker with a team at operation 614, for example, by email or other suitable equivalent. Optionally, different gear requirements for different positions or characteristics of players on the team may be established, and at operation 615 gear-relevant objects/products are automatically positioned, thereby providing each type of user with automatically customized locker objects. At 607 a link may be provided (e.g., via email) allowing other team members to view the virtual locker. At operation 608 the system prompts the team member to sign up or log in (see FIG. 5). Once signed in to the system the user may accept the virtual locker which is added to the user's virtual locker room at operation 609.

An influencer may share the virtual locker as a public link that is broadcast on social media or in a blog, etc. that allows another user to click the link and follow the same process of viewing the locker, logging in or signing up, and adding the locker to his/her virtual locker room. Additionally, a coach may also choose to share a virtual locker publicly instead of by email.

Virtual lockers with no theme and with fully customizable content may be created by generating a blank locker and adding objects from any genre to the virtual locker. A virtual locker created in the themed fashion may be applied in a scenario in which, for example, a sports season is about to start and new gear is required for the player.

Figure 8:
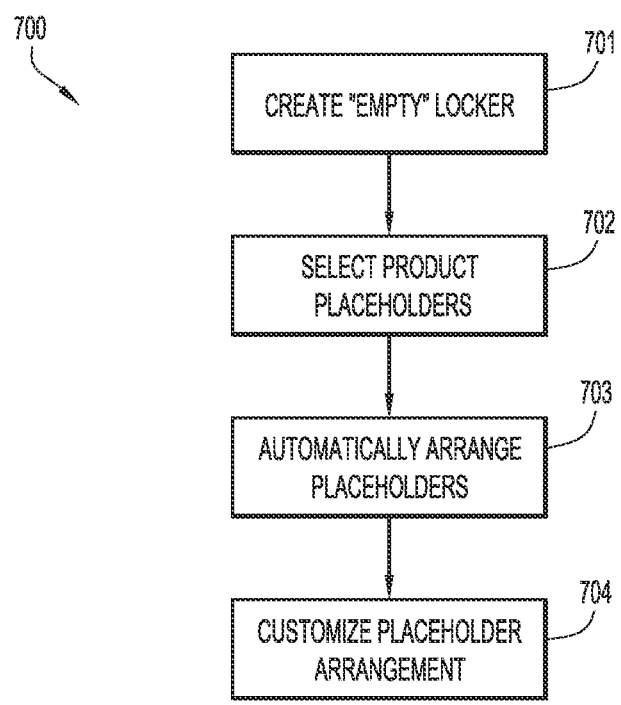
FIG. 8 is a flow diagram of operations showing creating a fully customized graphical compartmentalized virtual locker according to an embodiment of the techniques disclosed herein.

FIG. 8 is a flow chart showing customization of virtual locker placeholders. The placeholders may link to a wide variety of items from multiple genres. To create an un-themed, fully customized virtual locker, a user may create an "empty" virtual locker at operation 701. An empty virtual locker does not contain pre-selected placeholders; rather, it contains zones or compartments to act as receptacles for a placeholder. The zones, which have pre-defined shapes and aspect ratios existing within areas of the virtual locker, represent areas where placeholders can be placed. For example, square (1:1 aspect) zones accept placeholder images that are roughly square or otherwise conveniently fit in the zone.

After generating the empty virtual locker, the user is provided with a user interface that allows selection of placeholders from any genre (e.g., sport, theme, or otherwise). The user selects placeholders at operation 702, and the locker automatically arranges placeholders in the background at 703 by prioritizing placeholders into preferred shapes in the locker. Preferably, the objects are configured so that portions of all objects are visible to the user. If objects do not fit within a compartment their configurations may be transformed. If all acceptable shapes for a placeholder are taken, the placeholder occupies a custom box within the locker (see FIG. 12).

At operation 704, after the user selects the desired placeholders, the user may manually customize them, e.g., by rearranging the placeholders. This may be accomplished by drag/drop or other suitable technique whereby a user positions the placeholder in a zone.

Figure 9:
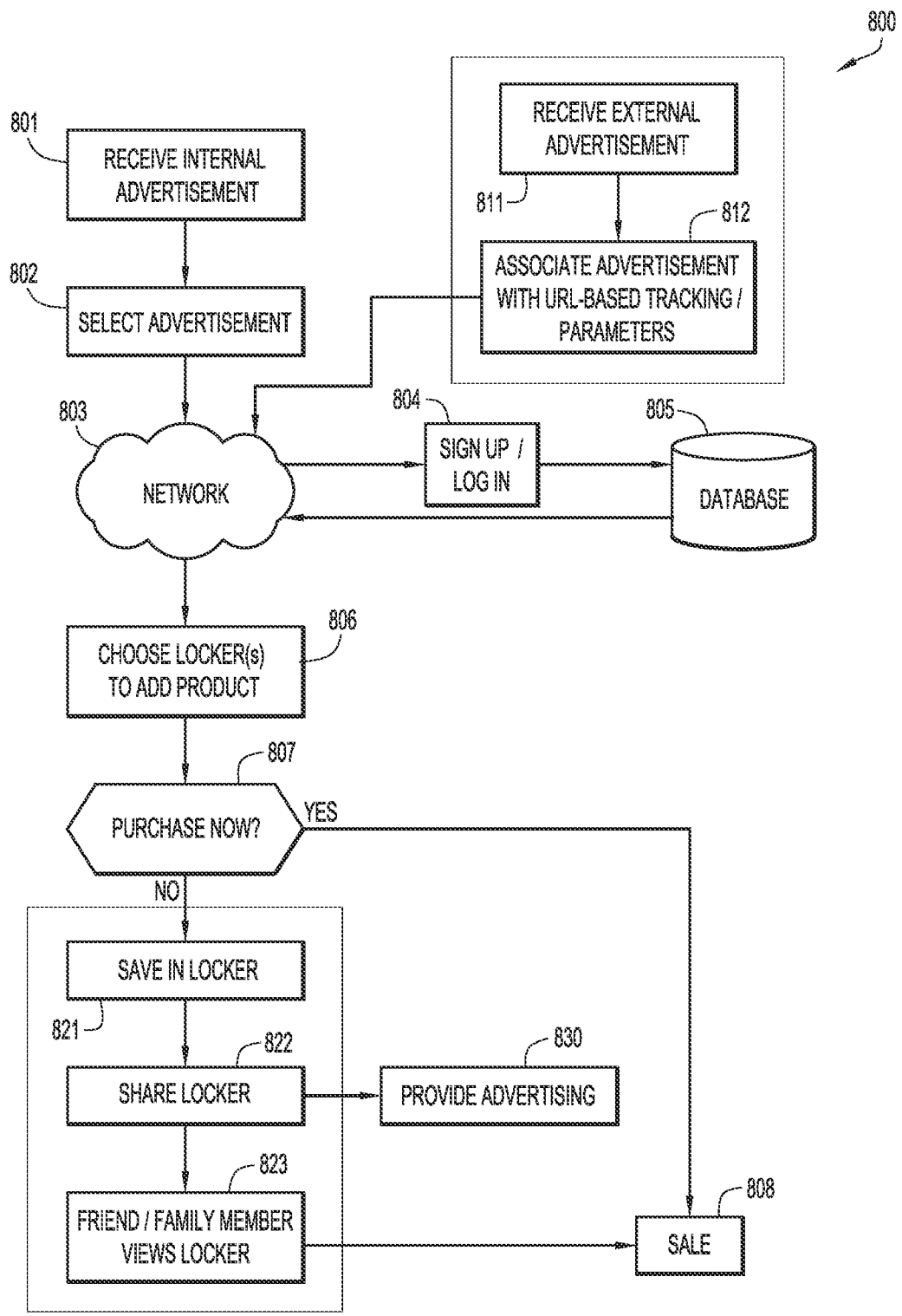
FIG. 9 is a flow diagram of operations showing integration of advertisements into the graphical compartmentalized virtual locker according to an embodiment of the techniques disclosed herein.

FIG. 9 shows operations 800 of the virtual locker receiving advertisements and selling objects. More particularly, virtual lockers allow retailers to advertise their products and build brand loyalty. At operation 811 an external advertisement (e.g., an advertisement published on an external platform) is received. At operation 812 the advertisement is associated with a link to navigate the user to another page accessible by the system, which page may track metrics associated with the advertisement using cloud-based technologies over a network 803, based on the parameters of the link corresponding to the product advertisement. Similarly, at operation 801 internal advertisements may be received. At 802 the user selects the advertisement. Advertisers running advertisements directly on the system's website, or on another platform, create advertisements with a clickable action item to "Add item to your locker".

Regardless of the source of the advertisement (internal or external), the system prompts the user to log in or sign up at operation 804, and the data is stored in database 805. At operation 806 users may add objects/products to any of their virtual lockers, with the option to create a new virtual locker. At operation 807 the user determines whether to purchase the product at that time or later. The item may be saved in the system's database and the user's virtual locker may be updated by selecting the item as a replacement for the placeholder. If the product is purchased immediately, at operation 808 the system progresses through sales transactions. If the product/object is purchased later, at operation 821 the product is saved at a location reserved for purchased products, either in a locker compartment reserved for purchased objects or a separate virtual locker of the user reserved for purchased objects. At operation 822 the stored product is shared with the user's corresponding social media network, providing additional advertising at operation 830. At operation 823 the virtual locker is provided to another user to view the product. The other user may purchase the product for the user at operation 808.

Figure 10:
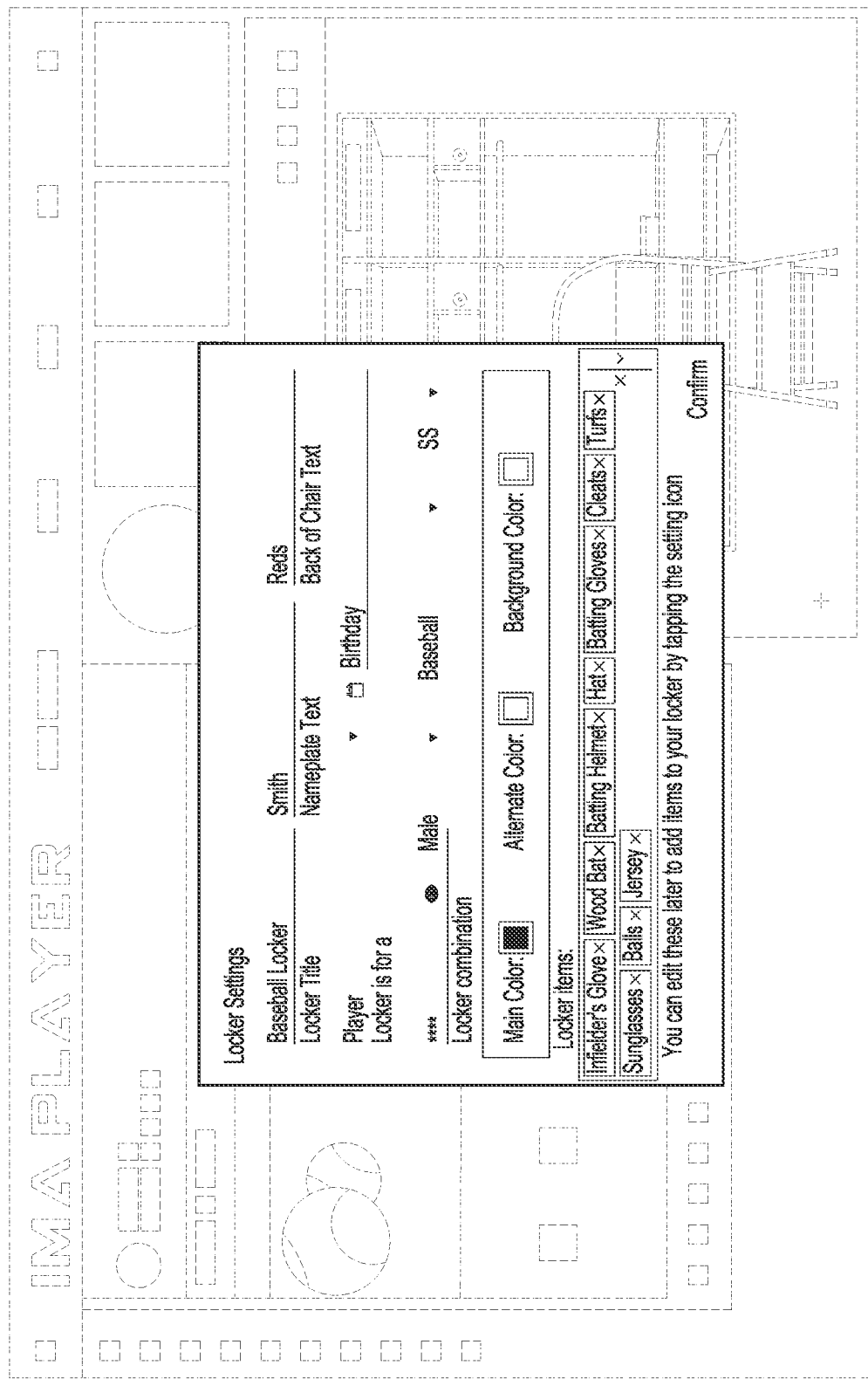
FIG. 10 is an example screen shot showing the graphical compartmentalized virtual locker settings page, with a portion of an empty graphical compartmentalized virtual locker shown in the background, lower right.

FIG. 10 is a screenshot showing virtual locker settings for a virtual locker that is automatically provided to the user. The user may enter a title for the virtual locker, a nameplate text, as well as a team name. The user may also choose a color scheme for the locker. If the user selects a sports theme for the locker, placeholder items automatically populate the locker with predetermined products related to that sports theme, and the locker stores objects as they are added. Upon purchase of the corresponding product/service, the object is associated (either manually or automatically by the system) with a tag or label indicating that the product has been purchased when an external user marks an item as purchased for the user. The virtual locker may have multiple placeholders with each placeholder associated with a plurality of objects. As noted above, in addition, or alternatively, the purchased object may be moved to a compartment of the virtual locker reserved for purchased objects or to a separate virtual locker of the user that is reserved for purchased objects. The stored purchased objects may have additional data related to the object associated therewith, including but not limited to, details regarding product purchase, user information, time of purchase, and other details about the transaction. This data may be provided to the user to identify others who have purchased the object.

Additionally, a user may add an item to a virtual locker for re-purchase and may add such items to other selected virtual lockers. In other cases, another user may ask for a product recommendation, and the user may share the object corresponding to the purchased product. The other user may accept the recommendation and add the item to one or more virtual lockers.

The screenshot in FIG. 10 also shows in the background a graphical compartmentalized virtual locker settings page, with an empty graphical compartmentalized virtual locker shown at the lower right. The user may customize the locker according to any desired criteria, including but not limited to, customizing a locker title, a nameplate text, and/or a team name. The user may also select a color scheme for the virtual locker. If the user selects a sports theme for the virtual locker, placeholder items automatically populate the virtual locker with predetermined products related to the selected sports theme.

Figure 11:
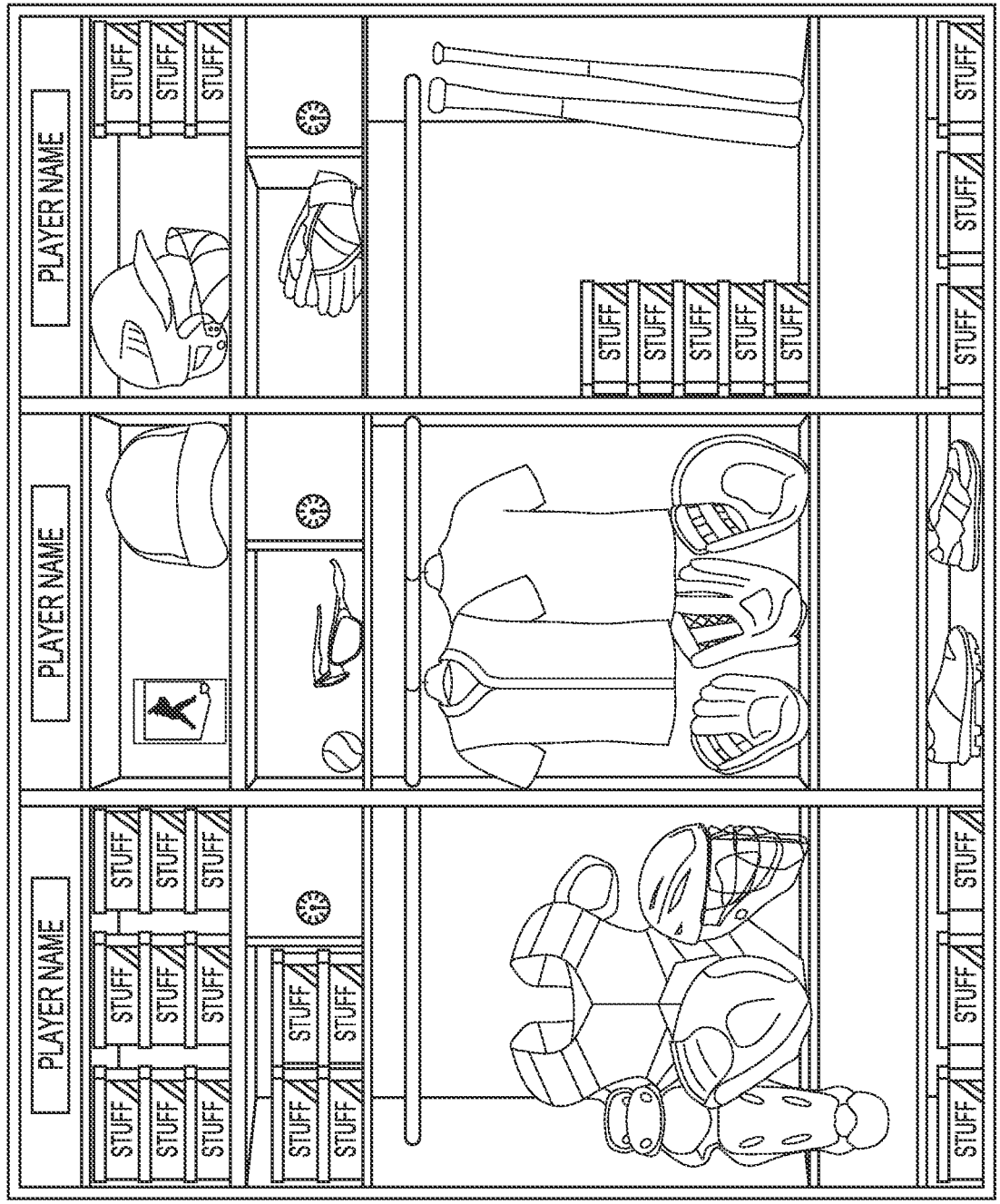
FIG. 11 is a screen shot of a baseball-themed graphical compartmentalized virtual locker stocked with objects (e.g., products) wherein images or holograms of objects have been generated and placed into different sized compartments.

FIG. 11 illustrates an example of a displayed baseball-themed virtual locker populated with images of baseball-related objects, wherein hologram icon images of objects have been generated and placed into appropriate compartments. Alternatively, or in addition, two-dimensional iconic representations may be used. The user of this virtual locker may select (e.g., click on) any of the displayed objects to receive information for related products (e.g., via links to the $3^{rd}$ party selling the product), which may also be stored in the virtual locker for that category. Thus, clicking on an object may generate user options for other related objects, and the user can store these objects in the virtual locker as well. For example, clicking on a bat will provide the user with options of bats the user may desire to own, and the user can select his/her favorite bat to save in the locker. Various bats and other related objects (e.g., batting gloves) may be shown that match user's profile (i.e., age, gender, etc.). As illustrated, the compartments may include shelves for storing stackable objects, vertically elongated spaces with hanger bars to store hanger supported objects, spaces suitably sized for receiving footwear or other sports equipment, etc.

Figure 12:
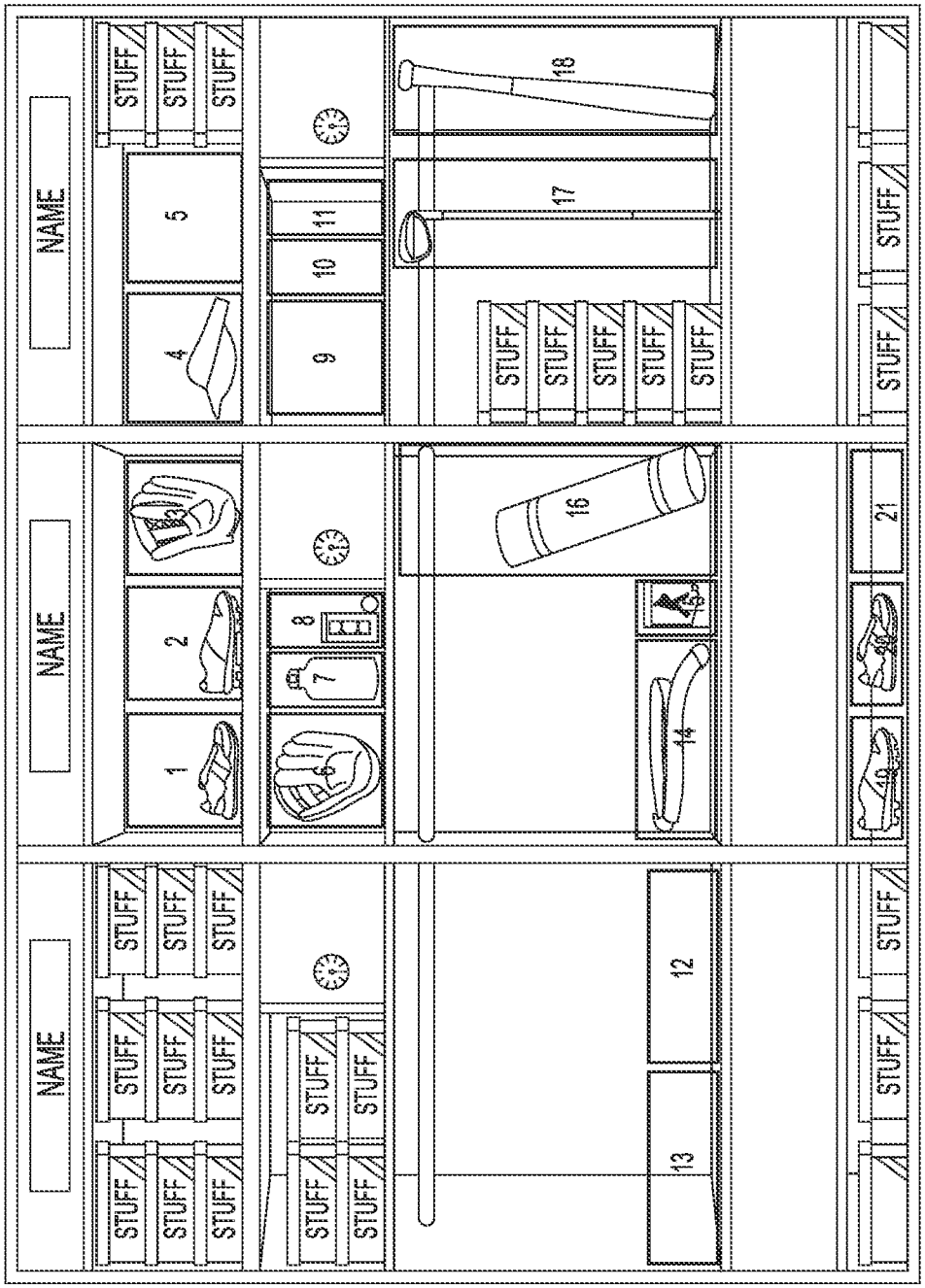
FIG. 12 is a screen shot of a customized graphical compartmentalized virtual locker showing placeholders

FIG. 12 depicts a fully customized virtual locker, without a selected theme, with compartments containing placeholders. A placeholder may undergo processing to be reshaped and/or resized into dimensions suitable for the compartment in which it is to be placed. Placeholders may be replaced by selected objects that may undergo reshaping and/or resizing to be placed into the corresponding compartment. For example, a baseball glove and a thermos are shown in reduced size to fit into a small locker compartment. In other words, objects may be reconfigured to be displayed in compartments based on their dimensions, and may be transformed as needed. Long objects may be placed in taller compartments, as illustrated by the baseball bat and golf club shown in FIG. 12. This provides the user with choices in the layout of the locker while keeping the locker attractive to the eye.

Figure 13:
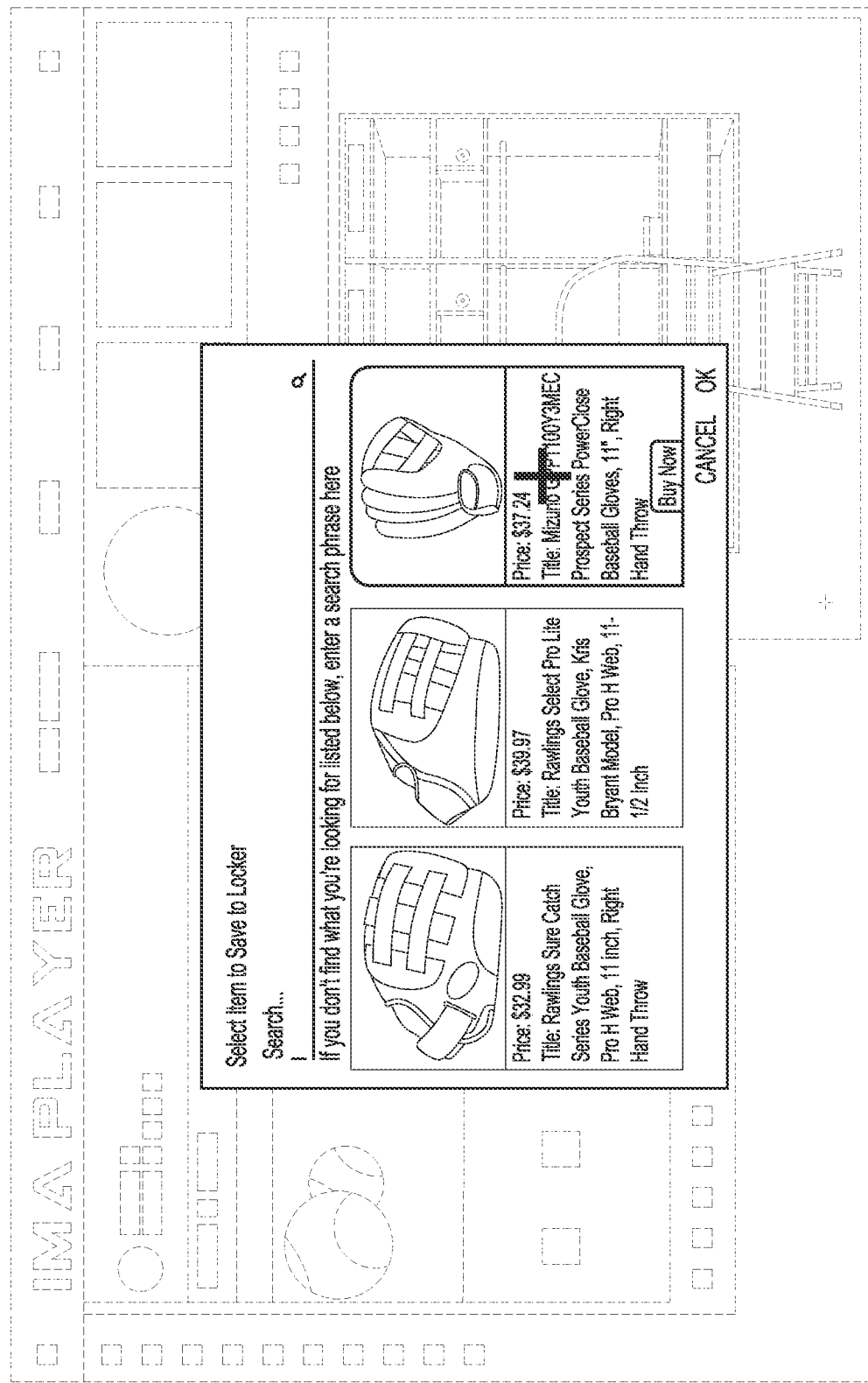
FIG. 13 is a screen shot demonstrating aspects of populating a placeholder item with desired products.

FIG. 13 is a screenshot demonstrating the procedure for population of a placeholder item with a desired product. When selecting objects to store in a virtual locker, the user is shown objects from a plurality of websites. Objects and corresponding details are received from $3^{rd}$ party APIs, for example. The present system uses the object information combined with an affiliate ID to create a click on link for that object. This link may be used by the user to purchase the object (e.g., "Buy Now"), or the object can be saved to the user's virtual locker. If saved to the locker, the object image and details are stored in the system database and the generated link is stored to provide later access to the $3^{rd}$ party web site for item purchase by the user or a connected user (i.e., friend or family member of the user).

Figure 14:
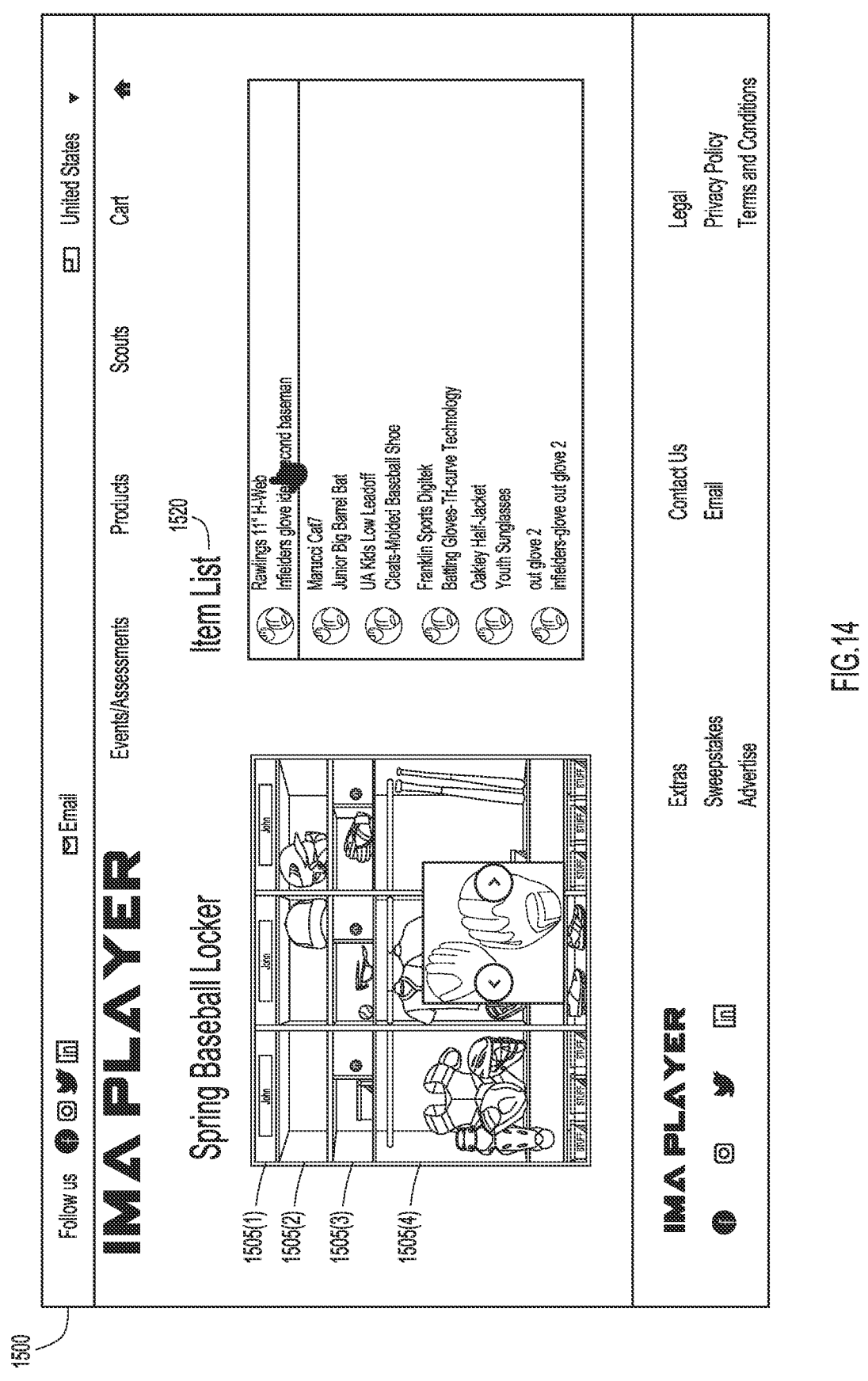

FIG. 14 is a screenshot 1500 showing a public view of a virtual locker that has been shared with other users. Once a user has accessed the application, the user may view the details of the objects saved in a connected user's locker. The objects may also be provided as a scrollable item list 1520 of all objects saved in all connected users' virtual lockers. Hovering over an object in the list shows the object in the virtual locker, preferably magnified, with the ability to navigate between objects. Clicking on an object accesses the associated retailer's website (via an affiliate link) allowing the user to purchase the object.

FIG. 14 also shows at least four different compartment zone shapes based on corresponding aspect ratios of the placeholders. Some placeholders may fit into multiple compartments 1505(1)-1505(4) (e.g., sunglasses may be placed in a rectangular landscape shape), while other placeholders are placed in specific compartments suitable for the size and shape of the object (e.g., a tall compartment for a bat). This approach allows the user to customize the user's virtual locker while maintaining a suitably convenient layout. The dimensions of the compartments may be established by pre-defined aspect ratios, which may be determined automatically by the system or manually by the user. For example, when a new placeholder is added to the system, the aspect-ratio for the placeholder may be provided manually by the user or determined automatically by the system.

Figure 15:
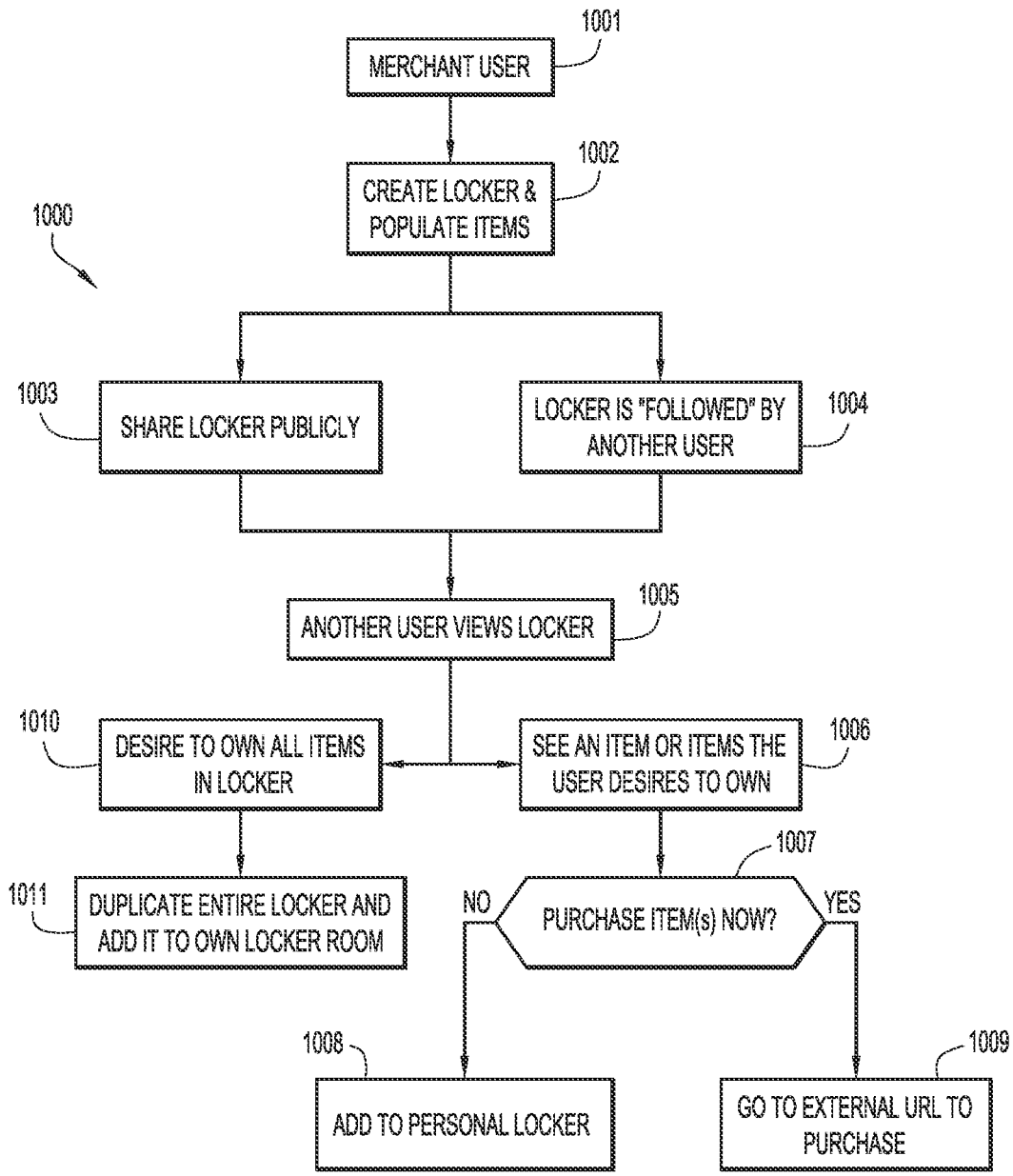
FIG. 15 is a flow diagram of operations showing how a team coach may create a virtual locker with stored virtual objects viewable and accessible by team members.

What has been described to this point applies to a user who is a consumer of products creating a locker or other display unit on the system. Described immediately below is functionality for sellers, merchants and retailers for creating virtual storefronts using the virtual locker concept. These users are able to generate their own virtual storefronts to promote products for purchase by others who may add products their lockers. In this format, a seller may be the coach of a team who has merchandise his players can purchase. This coach may create a locker with the items he/she sells, and the players on his/her team can view the coach's locker and then either add those items to their lockers for future purchasing or purchase them directly from the coach's locker. FIG. 15 outlines this process.

Referring to FIG. 15, a merchant user (a Coach, influencer, multi-level-marketer, or otherwise) creates a locker 1001 and populates items 1002 in his/her locker the same way a user would do so at operation 104 in FIG. 2. Once the locker is created it can be viewed publicly and may be discovered in one of two ways; the merchant user may share the locker publicly via a public link 1003; or he/she may have followers within the system who will receive notifications that the locker was created/updated, and they can discover the locker from their own actions 1004. Once another user views the locker 1005, the other users may either see certain products they would like to own 1006 or may desire to own all the items in the locker 1010, in which case they could choose to duplicate the entire locker and add it to their locker rooms 1011. In the event only specific items appeal to the user 1006, the viewing users can choose to either add the items to their personal lockers for purchase later 1008 or can click on the merchant locker and be taken to an affiliate-linked URL to purchase the items directly 1009.

Merchant lockers 1000 are particularly advantageous in the case of a smaller-scale merchant with limited quantities or specific products appealing to a limited demographic; that is, companies may have product categories they would like to promote and may have enough products that, depending on the demographics of the end-user, they would like to show as different product results based on those demographics. For example, if a sporting goods store wanted to promote a locker with a t-shirt, it could create a t-shirt placeholder in its locker (along with many other placeholder products). Then, if a user views the locker, the system will know demographic information about the user and could show an age/gender/style-appropriate t-shirt. If the user is a youth male athlete, the t-shirt that gets shown could be a specific SKU for youth male athletes. If the user is a female coach, the t-shirt shown might be a totally different SKU. The consumer user may have the ability to add specific items to his/her locker or duplicate the entire locker. Other examples: a sporting goods store promoting a fall football locker that has youth jerseys, cleats, pads, and helmets for male youth athlete users, and whistles, clipboards, sneakers, and hats for a coach; a clothing company may have a fall styles locker with outfit options for shoes, pants, shirts, sweaters, sunglasses, and hats for different age/gender demographics.

Figure 16:
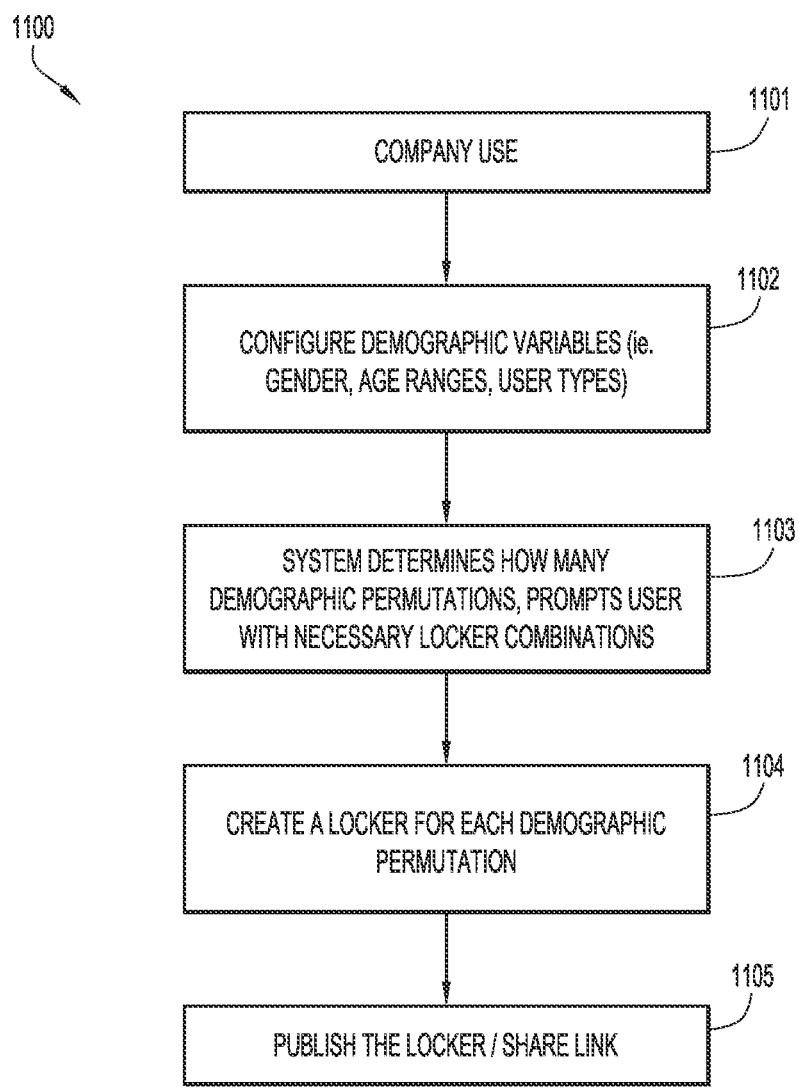
FIG. 16 is a flow diagram of operations showing how a business may create a virtual locker by customizing lockers for different combinations of demographic information.

In the case of a company locker, referring to FIG. 16, the company 1101 may create a locker by customizing lockers for each different combination of demographic information (e.g., male athlete under 10 years old, female athlete between 10 and 16 years old, female coach over 30 years old, etc.). The age and gender options may be customizable and optional at operation 1102; e.g., if a company wanted all users under age sixteen to see the same products it could leave the gender specification unanswered (as is typical in the case of electronics sales, i.e., gaming hardware). Once the demographic variables have been set, the system may generate all possible permutations and prompt the company to create a locker for each combination 1103. For example, the system may show three age ranges for two genders which generates six lockers for the company to create at 1104. Once the combinations are complete, the company can publish/share the locker publicly at operation 1105, and then whatever user type is visiting the locker, the system would automatically show the demographic-customized locker for that user.

Figure 17:
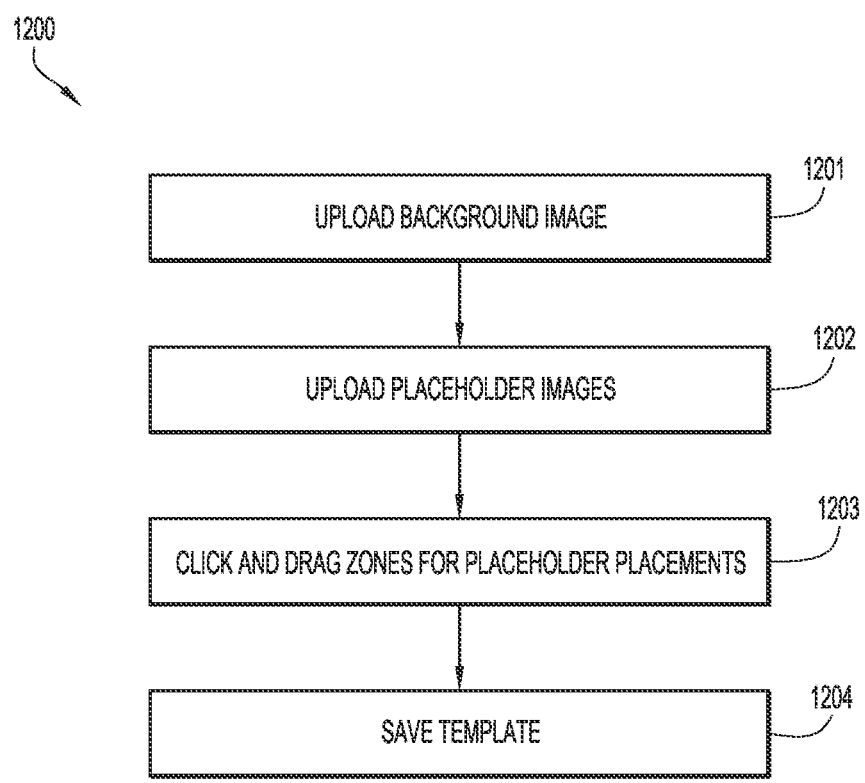
FIG. 17 is a flow diagram of operations showing how influencers, companies, and merchants may create their own types of visually presented display units instead of lockers.

The visual presentation of a virtual locker conveys the concept of a location in a public space where the contents "belong" to the user. For this reason, it is an effective place to start. However, the concepts of this application apply to other visuals. For example, a makeup blogger who has a product line to promote, it would not be consistent with her brand if her products were shown in a locker environment. In certain instances, the underlying system would still function the same, but the user interface would convey a different display unit visual. In the case of a makeup blogger products may be better displayed a virtual vanity for which the background image would be different and placeholder x, y, z coordinates would change, while the rest of the functionality would be the same. To accomplish this, these influencers, companies, and merchants may have an admin tool for creating their own types of visually display units instead of lockers. As shown in FIG. 17, a virtual vanity image may be the background at 1201, placeholder images may be uploaded at 1202, and then a user interface may allow the creator to click and drag zones where placeholders may be placed at 1203 (i.e., hanging from a bar, in a drawer, set on top of a surface) to allow for the container to be fully-customized. Once the container looks the way the user intends, the template may be saved to for subsequent use at 1204.

Figure 18:
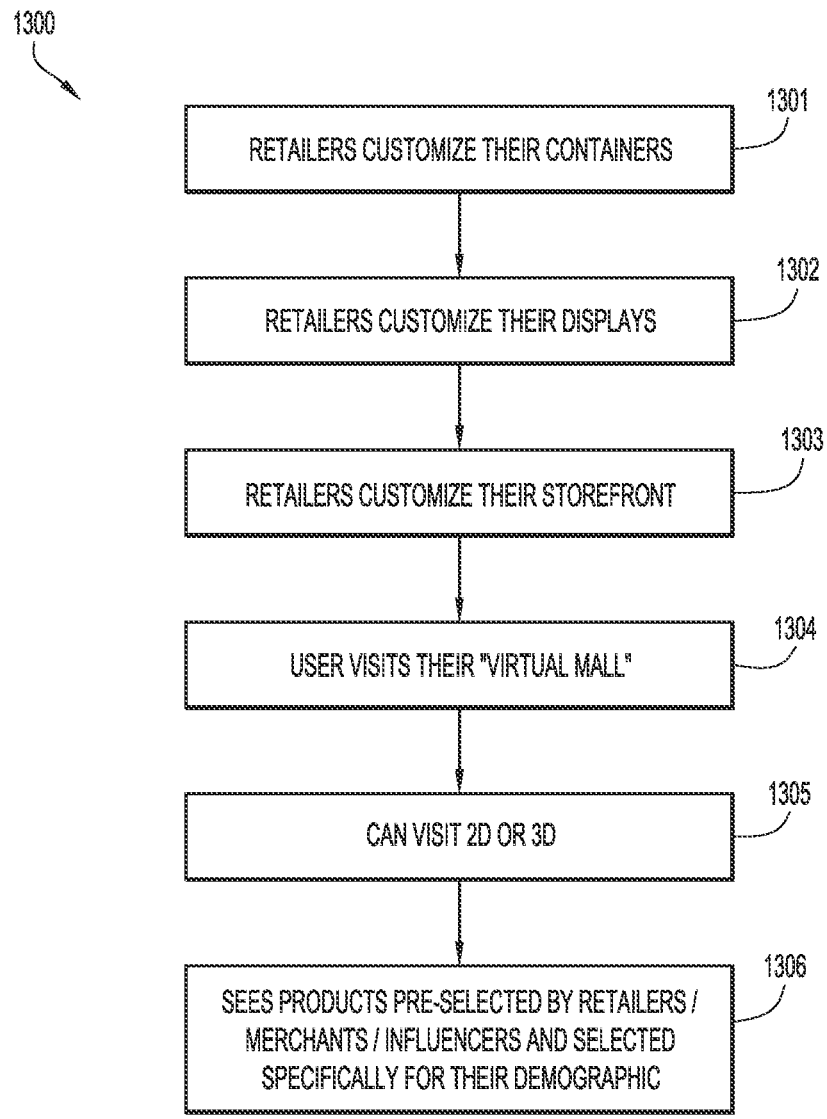
FIG. 18 is a flow diagram of operations showing how a virtual mall may be created and operated with multiple virtual display units of different "mall tenant" businesses.

Furthering the customization offered by custom containers, the system may integrate multiple users' public lockers into a virtual mall. Thus, if a user "follows" a retailer, merchant, influencer, or just another user, then any public lockers created by any of those users may be added to a virtual mall. The virtual mall provides a virtual display unit within which a user is able to see all the items within their "mall". If a user follows, for example, four friends, their coaches in two sports, and ten influencers and five retailers/companies, then all of these entities may have storefronts within that user's virtual mall. Each retailer may then have multiple containers within its store, similar to a display within a brick and mortar store. In effecting this, and referring to FIG. 18, retailers/merchants/influencers may have the ability to customize their containers at 1301, displays at 1302, and storefronts at 1303. As an example, a traditional department store may customize its container to show a mannequin, hangers, and shelves. A "display" allows it to configure multiple mannequins and shelves in a specific arrangement. Importantly, the storefront may have their logo with a designed entrance. This creates a virtual environment that provides an immersive experience in two- or three-dimensional presentations. As a full virtual mall, a user interface at 1304 may provide the user the ability to move a viewpoint around in a virtual mall in two dimensions on a computer screen and allow the user with a mouse/trackpad to pan and move around in a three-dimensional environment at 1305. Using Virtual Reality or other immersive 3D simulators, a user may easily scan the entire virtual mall. The virtual mall provides retailers with the ability to customize the products they would like to promote to users who are following their brand and allows users to follow influencers and aggregate all the products in one virtual space. Thud, whereas a conventional "search" requires users to actively seek out results, this virtual mall concept provides a consolidated system wherein retailers can pre-populate search results for users based on user demographic and other information and give the user the ability to easily scan or survey products (as if they were in a mall) that are very relevant to them. The experience for users is such that the entire mall seems to be built just for them at 1306.

Cash back/rewards may be offered to end users through revenue-sharing programs facilitated automatically by the system. Affiliate links may be used where applicable, and an automatic revenue share of the affiliate revenue may allow for a cash-back/reward program offered to the end-user. An item that isn't on sale anywhere else may be offered for regular price on the system, but an end-user may know that a certain percentage is received as a cash-back reward for all purchases, so he/she would be more likely to purchase on the system. Rewards could be structured as credits towards future purchases, coupons offered by advertisers on the system (e.g., receive $20 in cash back, or receive a 30% off coupon to Retailer X). The ability to offer a 30% reduction coupon may be a service that sold by Retailer X for a period of time (e.g., for $5 per user who accepts your reward, you can offer a 30% off coupon). Part of the service could be a reimbursement of some sort (e.g., revenue share) in case a coupon is accepted as a reward by a user. In the case where a user had $20 in cash back from affiliate revenue sharing, if the user chooses to receive a 30% off coupon instead, the system may provide $15 in revenue share back to Retailer X since the user forewent the $20 reward. In this case, the $5 "cost" for advertising the coupon would be offset by $15 in revenue share and instead convert to a $10 reimbursement for Retailer X. For example, if an e-gaming hardware company wants to advertise on the site and offers a 30% off reward coupon to users, a negotiation with Retailer X could transpire where Retailer X would agree to offer a 30% off coupon as a reward for users. In such case, instead of the system providing the user with $20 cash back, $10 may be paid by the system to the Retailer for every user who accepts the coupon reward.

Disclosed herein is a themed virtual locker or other visually configured theme-relevant virtual display unit for a set of related objects, e.g., gear for a sport, activity, interest, etc. Products and services associated with that specific genre/theme may be presented to the user, and virtual objects such as holograms of potential products and services corresponding to that genre may be selected by the user and arranged in the virtual container. Upon selection, the virtual objects provide dimensional representations of the products and/or services available to the user. The user may store the objects in the virtual container. In certain aspects of the disclosed method and system the products may be purchased and/or shared within a social media network. Techniques disclosed herein provide an improvement over existing approaches by providing a single point of access, leading to efficiency. Additionally, the disclosed embodiments provide products to users based in part on popularity of the product with other users having a virtual container of the same or similar theme.

Advantages of the disclosed techniques and embodiments include but are not limited to reducing personal information provided to a third party and the number of applications needed to access, save or share a product. Disclosed techniques additionally provide ease of sharing and promoting products and may be customized to a user's interests. Sponsored newsfeeds comprising social media posts of products or services may be saved in virtual lockers.

The disclosed embodiments include a method, system, device, and/or a computer program at any possible technical detail level of integration. The computer program may include a computer readable storage medium (or media) having computer readable program instructions thereon for causing one or more processors to carry out aspects of the present disclosure.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable storage medium may be a tangible device that can retain and store instructions for use by an instruction execution device. The computer readable storage medium may be, for example, but is not limited to, any of electronic storage devices, magnetic storage devices, optical storage devices, electromagnetic storage devices, semiconductor storage devices, or any suitable combination of the foregoing. A non-exhaustive list of more specific examples of the computer readable storage medium includes the following: portable computer diskettes, hard disks, random access memories, read-only memories, erasable programmable read-only memories, static random access memories, portable compact disc read-only memories, digital versatile disks, memory sticks, floppy disks, mechanically encoded devices such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, such as light pulses passing through a fiber-optic cable), or electrical signals transmitted through a wire.

Aspects of the present disclosure are presented with reference to flowcharts and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the accompanying drawings illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Several features distinguish the present technology over other approaches. For example, present approaches may be integrated with a social media platform, allowing objects to be loaded into relevant themed virtual display units as holograms, dimensional images, or icons for the user and available for the user's authorized social connections to view. Additionally, a user may select any object corresponding to a product or service provided in a list in the display area to be downloaded into a compartment of the virtual display unit. Selected objects may be transformed (e.g., resized, warped, reshaped, etc.) in order to fit into a desired compartment. In some aspects, objects may be holograms corresponding to a particular product. Additionally, the system may use themes designated by users to target information, such as from advertising services or from other users that have selected the same theme, to specific users.

Examples provided herein are not intended to be limiting; present techniques may be applied to a wide variety of fields, including retail, finance, or any environment in which related images are grouped together and arranged for display in a compartmentalized virtual display. The examples are also not intended to be limited to a specific application, since the disclosed techniques may be used to generate displays of products or services in online environments, such as, for example, to share virtual lockers with a group through a social media connection.

It will be appreciated that the present disclosure includes within its scope the use of augmented reality to embellish the user's visual or auditory perception of the virtual locker or other virtual display unit with additional digital content. For example, the additional digital content may be text, images or sound superimposed over the virtual display unit or virtual object, or both, and may comprise subject matter tailored to the user's profile and/or serving to explain or enhance features or use of the display unit or object, or to provide context for those features or use.

Access to virtual lockers and virtual locker rooms may be provided via an account, a social media link or the like. Retail or other links may be linked to the object, providing the user with access to a third party retailer; or retail links may include links to retail providers or products from a user. In some cases, members of a group or organization may access a set of items for that group (e.g., sporting team items, etc.).

Virtual display units and thematically grouped virtual display units (such as locker rooms) may be used for any suitable genre, theme or interest including a sport, hobby, occupation, activity (e.g., online shopping), etc. Contents of the virtual display unit may be displayed by users of social media or by social media influencers to promote their products in the virtual display unit.

In other cases, virtual lockers or virtual locker rooms may be provided to users based on a user's GPS location to direct users to nearby stores containing items stored in the virtual locker room. In this regard, text notifications or alerts may be provided to, for example, notify the user of sales or other events pertaining to objects in their virtual display units or locker rooms, and user's may elect to receive, or not, such notifications or alerts.

In still other cases, athletic teams may use virtual lockers to promote and sell team products/apparel/game tickets. In some aspects, users may activate GPS location services and may be provided with the team's event schedule/game announcements/flash sales/stadium directory/venue map information or concessions, specifically food and beverage. Concessions may be purchased directly through applications and delivered to a stadium seat.

A user may follow a mall/event/fair, turn on the location GPS, and receive event or fair maps, announcements, posts, featured store products, flash sales, etc. Businesses promoting products may create their own virtual booth locker on the social media site to share with event customers. Users may follow that business and save its virtual booth locker on their accounts for future purchase of products corresponding to objects, or to share same with others. Users not on-site at a mall/event/fair can follow that mall/event/fair and can make purchases via the virtual booth locker. Enabling notifications will allow customer to see sales for purchase and delivery.

Stores may promote products on-line using the virtual locker and/or virtual locker room for the customer to select images to be arranged in the virtual locker. Such items may be shared, stored, or purchased. When a customer is at a store location, a GPS text alert may inform the customer of availability of connectivity to store. Notifications allow on-site customers to locate and inspect products, sale items, featured products, products of possible customer interest, etc. Notifications to followers may also allow off-site on-line customers to purchase flash sale items.

Restaurants may use a virtual locker to promote their menus to followers. The virtual locker allows for menu item selection, purchases, saving, sharing, etc., for a customer. When arriving at the restaurant, a GPS notification alerts the user to restaurant on-line connectivity, allowing the restaurant to promote specials, happy hours, nightly events, sales, etc.

A functionality is provided for sellers, merchants and retailers to create virtual storefronts using the virtual container concept. These users are able to generate their own virtual storefront to promote products for purchase by others by adding them to their virtual display units. The virtual storefronts may be provided as part of a virtual mall containing multiple storefronts, and virtual malls may be created to contain only stores displaying interests of a particular system user for possible transfer of products to that user's virtual locker.

The present disclosure is not to be limited in scope by the specific embodiments described herein. Indeed, other embodiments of and modifications to the present disclosure, in addition to those described herein, will be apparent to those of ordinary skill in the art from the foregoing description and accompanying drawings. Such other embodiments and modifications are intended to fall within the scope of the present disclosure. Furthermore, although the present disclosure is presented in the context of particular implementations in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method performed by a system comprising a system processor, a system database and multiple client systems of respective users in interactive communication with the system processor, said method comprising:
    establishing at each client system a respective graphical virtual display unit, wherein the virtual display unit represents a real container with a plurality of virtual compartments;
    displaying at each client system the container and the virtual compartments of the respective virtual display unit;
    obtaining and displaying virtual objects in respective virtual compartments of each virtual display unit;
    associating stored virtual objects in respective virtual compartments in a user's virtual display unit with information identifying a source from which those objects may be purchased for or by that user; and
    identifying those stored objects which have been purchased by or for that user and moving them to a virtual compartment or separate display unit reserved for purchased objects.

2. A method performed by a system comprising a system processor, a system database and multiple client systems of respective users in interactive communication with the system processor, said method comprising:
    establishing at each client system a respective graphical virtual display unit, wherein the virtual display unit represents a real container with a plurality of virtual compartments;
    displaying at each client system the container and the virtual compartments of the respective virtual display unit;
    obtaining and displaying virtual objects in respective virtual compartments of each virtual display unit;
    associating a profile of the user of each client system with the virtual display unit of that client system;
    storing at said system database the profiles of said users;
    for each client system, obtaining a list of objects that are filtered based on the profile of the user of that client system; and
    enabling the user of each client system to select one or more objects from said list that are of interest to that user for display in selected compartments of said virtual display unit as said virtual objects.

3. A method performed by a system comprising a system processor, a system database and multiple client systems of respective users in interactive communication with the system processor, said method comprising:
    establishing at each client system a respective graphical virtual display unit, wherein the virtual display unit represents a real container with a plurality of virtual compartments;
    displaying at each client system the container and the virtual compartments of the respective virtual display unit;
    obtaining and displaying virtual objects in respective virtual compartments of each virtual display unit; and
    selectively customizing the virtual display units by one or more of adding a name to identify the virtual display unit, adding a name to a virtual object stored at the virtual display unit, and adding custom colors to a background or virtual compartments of the virtual display unit.

4. A method performed by a system comprising a system processor, a system database and multiple client systems of respective users in interactive communication with the system processor, said method comprising:
    establishing at each client system a respective graphical virtual display unit, wherein the virtual display unit represents a real container with a plurality of virtual compartments;
    displaying at each client system the container and the virtual compartments of the respective virtual display unit;
    obtaining and displaying virtual objects in respective virtual compartments of each virtual display unit; and
    determining if a virtual object to be stored does not fit within a selected virtual compartment and, if so, reconfiguring the virtual object into a shape and size that fits within the selected virtual compartment.

5. A method performed by a system comprising a system processor, a system database and multiple client systems of respective users in interactive communication with the system processor, said method comprising:
    establishing at each client system a respective graphical virtual display unit, wherein the virtual display unit represents a real container with a plurality of virtual compartments;
    displaying at each client system the container and the virtual compartments of the respective virtual display unit;
    obtaining and displaying virtual objects in respective virtual compartments of each virtual display unit;
wherein a first compartment of a respective virtual display unit includes a placeholder indicating a category of products for selection and storage in the first compartment, and the method further comprises:
    selecting a virtual object representing a product within the category of the placeholder; and
    replacing the placeholder in the first compartment with the selected virtual object.

6. A method performed by a system comprising a system processor, a system database and multiple client systems of respective users in interactive communication with the system processor, said method comprising:
    establishing at each client system a respective graphical virtual display unit, wherein the virtual display unit represents a real container with a plurality of virtual compartments;
    displaying at each client system the container and the virtual compartments of the respective virtual display unit;
    obtaining and displaying virtual objects in respective virtual compartments of each virtual display unit;
    for each virtual display unit, establishing a respective theme reflecting an interest of a user of the client system at which that virtual display unit is established;
    storing at said system database the themes of said users;
    for each client system, obtaining a list of objects that are filtered based on the theme of the virtual display unit at that client system; and
    enabling the user of each client system to select one or more objects from said list that are of interest to that user for display in selected compartments of said virtual display unit as said virtual objects.

7. The method of claim 6 further comprising selectively enabling advertisements pertaining to a theme of a user to be displayed at the client system of that user.

8. The method of claim 6, further comprising:
associating a profile of the user of each client system with the virtual display unit of that client system;
storing at said system database said profiles of said users;
wherein the objects in said list of objects for each client system are further filtered based on the profile of the user of that client system.

9. A method performed by a system comprising a system processor, a system database and multiple client systems of respective users in interactive communication with the system processor, said method comprising:
establishing at each client system a respective graphical virtual display unit, wherein the virtual display unit represents a real container with a plurality of virtual compartments;
displaying at each client system the container and the virtual compartments of the respective virtual display unit; and
obtaining and displaying virtual objects in respective virtual compartments of each virtual display unit;
wherein a plurality of said users belong to an organization having an administrator and members, wherein the administrator establishes the virtual display units for said members according to a common theme associated with the organization and assigns the members as users to respective virtual display units.

10. The method of claim 9, wherein said theme established for a plurality of said virtual display units is a sport, and wherein the containers at said plurality of virtual display units are a respective plurality of virtual lockers with their virtual compartments differently sized and configured to accommodate and receive virtual objects pertaining to that sport.

11. The method of claim 10 further comprising:
for each of said virtual lockers, establishing said sport as a theme of the user of that virtual locker;
storing said theme for said virtual lockers at said system database;
for each of said virtual lockers, obtaining a list of objects pertaining to said sport; and
enabling the user of each locker to select one or more objects from said list and display the selected objects in compartments of said virtual locker as said virtual objects.

12. The method of claim 11, further comprising generating a virtual locker room containing all of said plurality of said virtual lockers.

13. A method performed by a system comprising a system processor, a system database and multiple client systems of respective users in interactive communication with the system processor, said method comprising:
establishing at each client system a respective graphical virtual display unit, wherein the virtual display unit represents a real container with a plurality of virtual compartments;
displaying at each client system the container and the virtual compartments of the respective virtual display unit;
obtaining and displaying virtual objects in respective virtual compartments of each virtual display unit;
enabling storing a plurality of said virtual objects in a single compartment of each of said virtual display units; and
arranging the virtual objects stored in a single compartment so that at least a portion of each stored object is visible in the virtual display unit.

14. The method of claim 13 further comprising enabling display of reviews of a virtual object stored in a virtual compartment of a virtual display unit in response to hovering or clicking over that virtual object by a user of the client system at which that virtual display unit is established.

15. The method of claim 13, further comprising:
associating a profile of the user of each client system with the virtual display unit of that client system; and
for each client system, obtaining a list of objects that are filtered based on the profile of the user of that client system;
wherein the objects in said list of objects for each client system are filtered based on the profile of the user of that client system.

16. A method performed by a system comprising a system processor, a system database and multiple client systems of respective users in interactive communication with the system processor, said method comprising:
establishing at each client system a respective graphical virtual display unit, wherein the virtual display unit represents a real container with a plurality of virtual compartments;
displaying at each client system the container and the virtual compartments of the respective virtual display unit;
obtaining and displaying virtual objects in respective virtual compartments of each virtual display unit; and
enabling selected third parties to have access to the virtual display units at client systems.

17. The method of claim 16 further comprising enabling display of reviews of a virtual object stored in a virtual compartment of a virtual display unit in response to hovering or clicking over that virtual object by a user of the client system at which that virtual display unit is established.

18. The method of claim 16, further comprising:
associating a profile of the user of each client system with the virtual display unit of that client system; and
for each client system, obtaining a list of objects that are filtered based on the profile of the user of that client system;
wherein the objects in said list of objects for each client system are filtered based on the profile of the user of that client system.

19. The method of claim 16 wherein the selected third parties include users of other client systems.

20. The method of claim 16 wherein at least one of said virtual objects is a hologram.

* * * * *